United States Patent
Nakazawa et al.

[11] Patent Number: 5,811,968
[45] Date of Patent: Sep. 22, 1998

[54] ROTATION ANGLE SENSOR

[75] Inventors: Hirotsugu Nakazawa; Yuhide Aoki, both of Isesaki, Japan

[73] Assignee: Unisia Jecs Corporation, Atsugi, Japan

[21] Appl. No.: 774,027

[22] Filed: Dec. 27, 1996

[30] Foreign Application Priority Data

Jan. 6, 1996 [JP] Japan ................................. 8-017123
Jan. 6, 1996 [JP] Japan ................................. 8-017124

[51] Int. Cl.$^6$ .............................. G01B 7/30; G01D 5/14; F02D 9/00
[52] U.S. Cl. .................. 324/207.2; 123/617; 324/207.25
[58] Field of Search ................................. 324/173, 174, 324/207.2, 207.21, 207.22, 207.25; 123/617, 414; 310/156

[56] References Cited

U.S. PATENT DOCUMENTS

| | | | |
|---|---|---|---|
| 2,536,805 | 1/1951 | Hansen, Jr. ...................... | 324/207.2 X |
| 3,162,804 | 12/1964 | Parsons ............................ | 324/207.2 X |
| 3,530,317 | 9/1970 | Lang ................................. | 324/207.2 X |
| 4,392,375 | 7/1983 | Eguchi et al. ............................ | 73/118 |
| 5,164,668 | 11/1992 | Alfors .................................... | 324/207.2 |
| 5,627,465 | 5/1997 | Alfors et al. ........................... | 324/207.2 |

FOREIGN PATENT DOCUMENTS 0 575 971 12/1993 European Pat. Off. .
41 23 131 A1 1/1993 Germany .
2 267 154 11/1993 United Kingdom .

*Primary Examiner*—Gerard R. Strecker
*Attorney, Agent, or Firm*—Foley & Lardner

[57] ABSTRACT

A rotation angle sensor for sensing a rotation angle of a pivotal member, such a throttle valve shaft, comprises a first unit including a magnet member and a second unit including first, second and third magnetic piece members which are circumferentially arranged to concentrically surrounds the magnet member. The first and second magnetic piece members are symmetrically arranged with respect to the magnet member. A structure is employed for connecting one of the first and second units to the pivotal member. A first electric device is employed for generating a first signal in accordance with a density of magnetic flux produced between the first and third magnetic piece members, and a second electric device is employed for generating a second signal in accordance with a density of magnetic flux produced between the second and third magnetic piece members.

17 Claims, 17 Drawing Sheets

ROTATION ANGLE SENSOR

BACKGROUND OF THE INVENTION

1. Field of the Invention

The present invention relates in general to sensors for sensing a rotation angle, and more particularly to sensors of a type which sense a rotation angle or open degree of a throttle valve installed in an air intake duct of an internal combustion engine.

2. Description of the Prior Art

Hitherto, electronically controlled internal combustion engines have been widely used in motor vehicles for the improvement in fuel economy, engine performance and emission control. In the engines of such type, the open degree of a throttle valve installed in an air intake duct is sensed as one of parameters inputted to a control unit of the engine.

For sensing the open degree of the throttle valve, various sensors have been proposed and put into practical use, which are for example a potentiometer type including a resistor and a brush, and a non-contact type including a magnetic resistance element.

In the potentiometer type, the brush is connected to a throttle valve shaft and slides on a naked part of the resistor in response to pivoting of the shaft. The resistance value picked up by the brush is electrically processed for obtaining an information signal representing the open degree of the throttle valve. As the non-contact type, Japanese Patent First Provisional Publication 2-29881 shows a rotation angle sensor. This sensor comprises generally a magnetic resistance element fixed to a stationary member, and a magnet arranged to rotate around the magnetic resistance element in response to pivoting of a throttle valve shaft. With rotation of the magnet, a magnetic field produced by the magnet around the magnetic resistance element is varied, which affects the resistance value of the magnetic resistance element. The resistance value is electrically processed for obtaining an information signal representing the open degree of the throttle valve.

However, due to inherent construction, the rotation angle sensors of the above-mentioned types have the following drawbacks. That is, in the potentiometer type, it tends to occur that during sliding movement the brush momentarily runs off the resistor, which induces a momentary cutoff of the information signal picked up by the brush. Furthermore, longer usage of the sensor brings about a marked abrasion of the brush, which tends to induce a failure of the sensor. In the non-contact type of the publication, the distance between a magnetic arm part of the magnet and the fixed magnetic resistance element varies greatly upon rotation of the magnet (viz., throttle valve shaft). However, this matter forces the output signal from the magnetic resistance element to have a trigonometric function characteristic relative to the rotation angle of the throttle valve shaft. That is, it is difficult to have the output signal which exhibits a linear characteristic to the open degree of the throttle valve.

Furthermore, in case of using the magnetic resistance element, the output signal from the same is largely affected by the surrounding temperature and the length of used time. In fact, it is difficult to correct the affected output signal.

SUMMARY OF THE INVENTION

It is therefore an object of the present invention to provide a rotation angle sensor which is free of the above-mentioned drawbacks.

According to the present invention, there is provided a rotation angle sensor which outputs an information signal which shows a linear characteristic to the rotation angle of a throttle valve shaft or the like.

According to the present invention, there is provided a rotation angle sensor whose sensing characteristic is stable.

According to the present invention, there is provided a rotation angle sensor whose durability and reliability are great.

According to the present invention, there is provided a rotation angle sensor for sensing a rotation angle of a pivotal member, which comprises a first unit including a magnet member; a second unit including first, second and third magnetic piece members which are circumferentially arranged to concentrically surround the magnet member, the first and second magnetic piece members being symmetrically located with respect to the magnet member; connecting means for connecting one of the first and second units to the pivotal member; first signal generating means for generating a first signal in accordance with a density of magnetic flux produced between the first and third magnetic piece members; and second signal generating means for generating a second signal in accordance with a density of magnetic flux produced between the second and third magnetic piece members.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

Referring to FIGS. 1 to 8, particularly FIGS. 1 to 5, there is shown a rotation angle sensor 100A of a first embodiment of the present invention, which is arranged to sense a rotation angle of a throttle valve installed in an air intake duct of an internal combustion engine.

Figure 1:
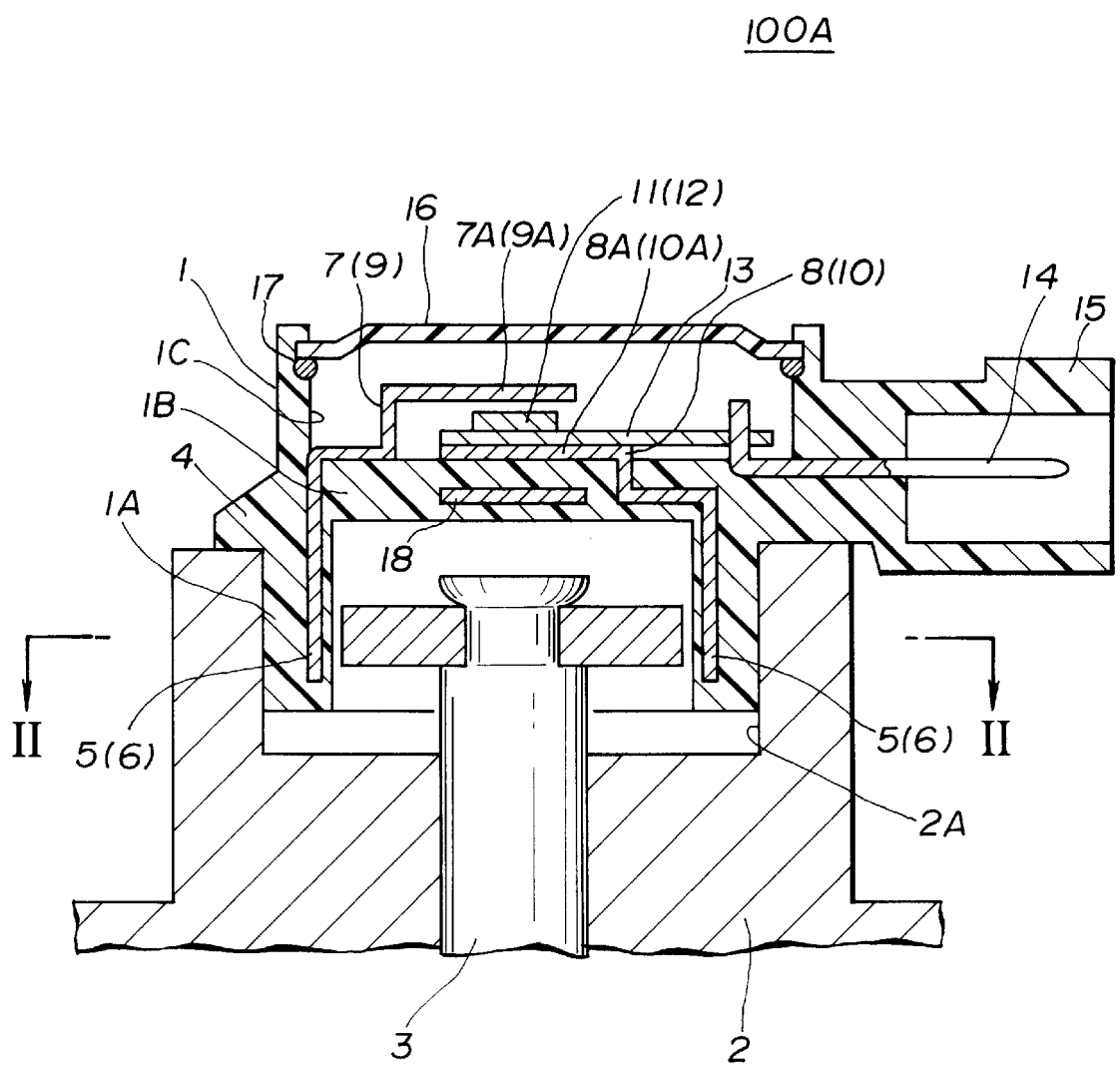
FIG. 1 is a vertically sectional view of a rotation angle sensor which is a first embodiment to the present invention.

In FIG. 1, denoted by numeral 1 is a plastic casing which comprises a tubular portion 1A having a bore directed downward and a thicker partition wall portion 1B arranged in the bore of the tubular portion 1A. Due to provision of the wall portion 1B, a circular recess 1C is defined in an upper part of the tubular portion 1A.

As shown, the tubular portion 1A is tightly received in a circular recess 2A formed in a throttle body 2. The throttle body 2 has a shaft 3 of a throttle valve (not shown) rotatably provided thereto. As shown, the shaft 3 has a head portion projected into the bore of the tubular portion 1A.

A magnet plate 4 is connected through caulking or the like to the head portion of the shaft 3 to rotate therewith. For this connection, the magnet plate 4 is formed at its center with an elllptical bore 4E (see FIG. 2) with which a neck part of the shaft 3 is engaged.

Figure 2:
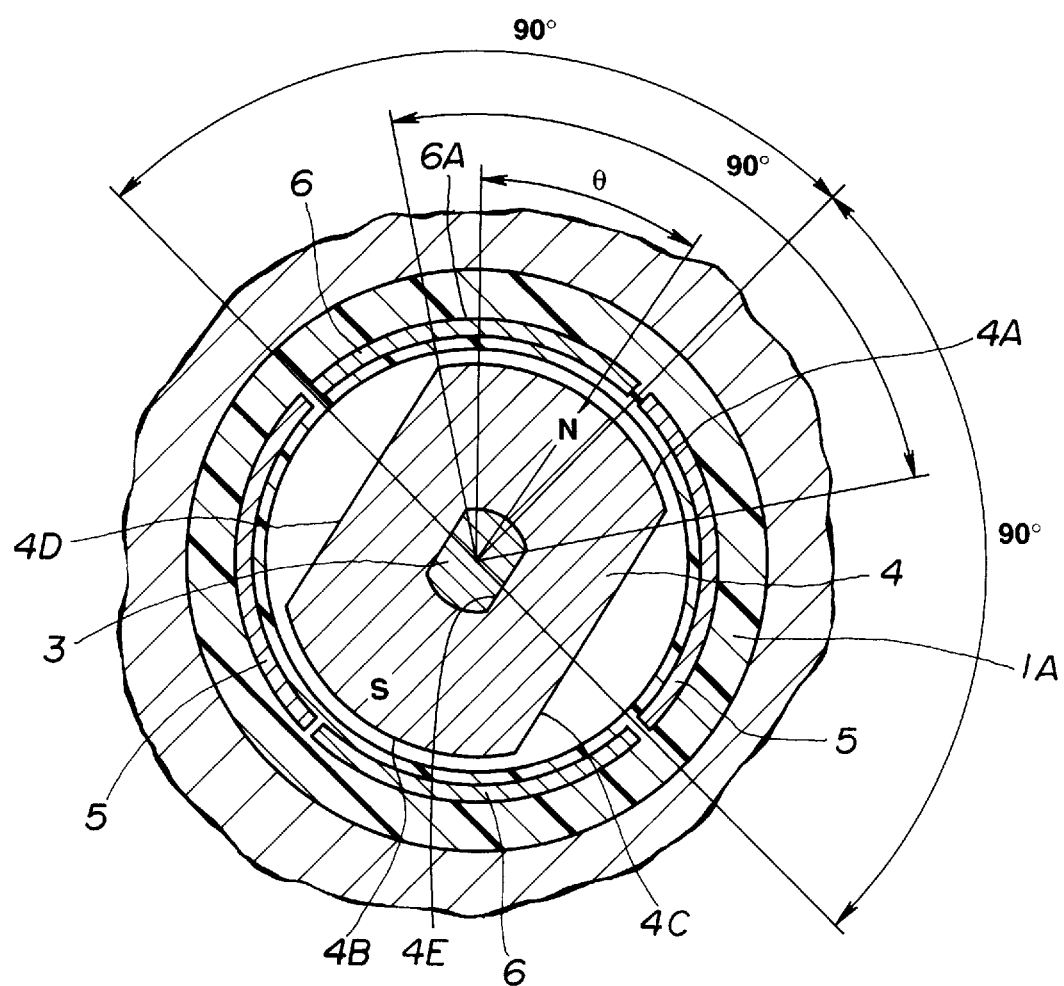
FIG. 2 is a sectional view taken along the line II—II of FIG. 1.

As shown in FIG. 2, the magnet plate 4 is shaped generally elliptical including diametrically opposed arcuate edges 4A and 4B and parallel side edges 4C and 4D. As shown, each arcuate edge 4A or 4B extends by an angle of 90° around the axis of the shaft 3. The arcuate edges 4A and 4B possess N-pole and S-pole respectively.

Denoted by numerals 5 and 5 are a first pair of magnetic piece portions which are embedded in the tubular portion 1A of the plastic casing 1.

As is understood from FIGS. 1 and 2, each magnetic piece portion 5 has a convex structure. As is seen from FIG. 2, the two first magnetic piece portions 5 and 5 are arranged at diametrically opposed positions with respect to the axis of the shaft 3, and they are arranged to surround the magnet plate 4 together with after-mentioned second pair of magnetic piece portions 6 and 6. Each magnetic piece portion 5 (and 6) extends by an angular range of 90° around the axis of the shaft 3. Each first magnetic piece portion 5 is a means for leading a magnetic field produced by the magnet plate 4 to a first Hall-element 11 through after-mentioned first magnetic path forming portions 7 and 8.

Denoted by numerals 6 and 6 are the second pair of magnetic piece portions which are embedded in the tubular portion 1A of the plastic casing 1, each being placed between the two first magnetic piece portions 5 and 5. Similar to the first magnetic piece portions 5 and 5, each second magnetic piece portion 6 extends by an angular range of 90° around the axis of the shaft 3. Each second magnetic piece portion 6 is a means for leading a magnetic field produced by the magnet plate 4 to a second Hall-element 12 through after-mentioned second magnetic path forming portions 9 and 10.

That is, the first and second pairs of magnetic piece portions 5, 5, 6 and 6 are arranged to constitute a divided cylindrical structure around the magnet plate 4. Furthermore, there is constantly defined an arcuate clearance between the cylindrical structure thus formed and each arcuate edge 4A or 4B of the magnet plate 4.

As is shown in FIG. 2, the rotation angle θ of the magnet plate 4 (that is, the rotation angle of the shaft 3) is determined with respect to a zero position (θ=0) where an intermediate part of the arcuate edge 4A of the magnetic plate 4 faces to an intermediate part 6A of one magnetic piece portion 6. Furthermore, the direction in which the arcuate edge 4A of the magnet plate 4 shifts rightward in FIG. 2 from the intermediate part 6A of the magnetic piece portion 6 is referred to as a positive direction, while, the direction in which the arcuate edge 4A shifts leftward from the intermediate part 6A of the magnetic piece portion 6 is referred to as a negative direction. Due to the nature of the throttle valve, the angular range with which the throttle valve shaft 3 can rotate is ±90°. That is, when the rotation angle θ is −90°, the throttle valve assumes a closed position, while, when the rotation angle θ is 90°, the throttle valve assumes a full open position (full throttle).

Denoted by numerals 7 and 8 are the first magnetic path forming portions which have base ends integrally connected to the first magnetic piece portions 5 and 5 and leading end portions projected into the circular recess 1C of the casing 1.

As is seen from FIG. 1, the leading end portion of the magnetic path forming portion 7 is positioned above the first Hall-element 11 installed in the circular recess 1C of the casing 1. While, the leading end portion of the other magnetic path forming portion 8 extends on the wall portion 1B of the casing 1 along a back surface of an after-mentioned circuit substrate 13.

Figure 4:
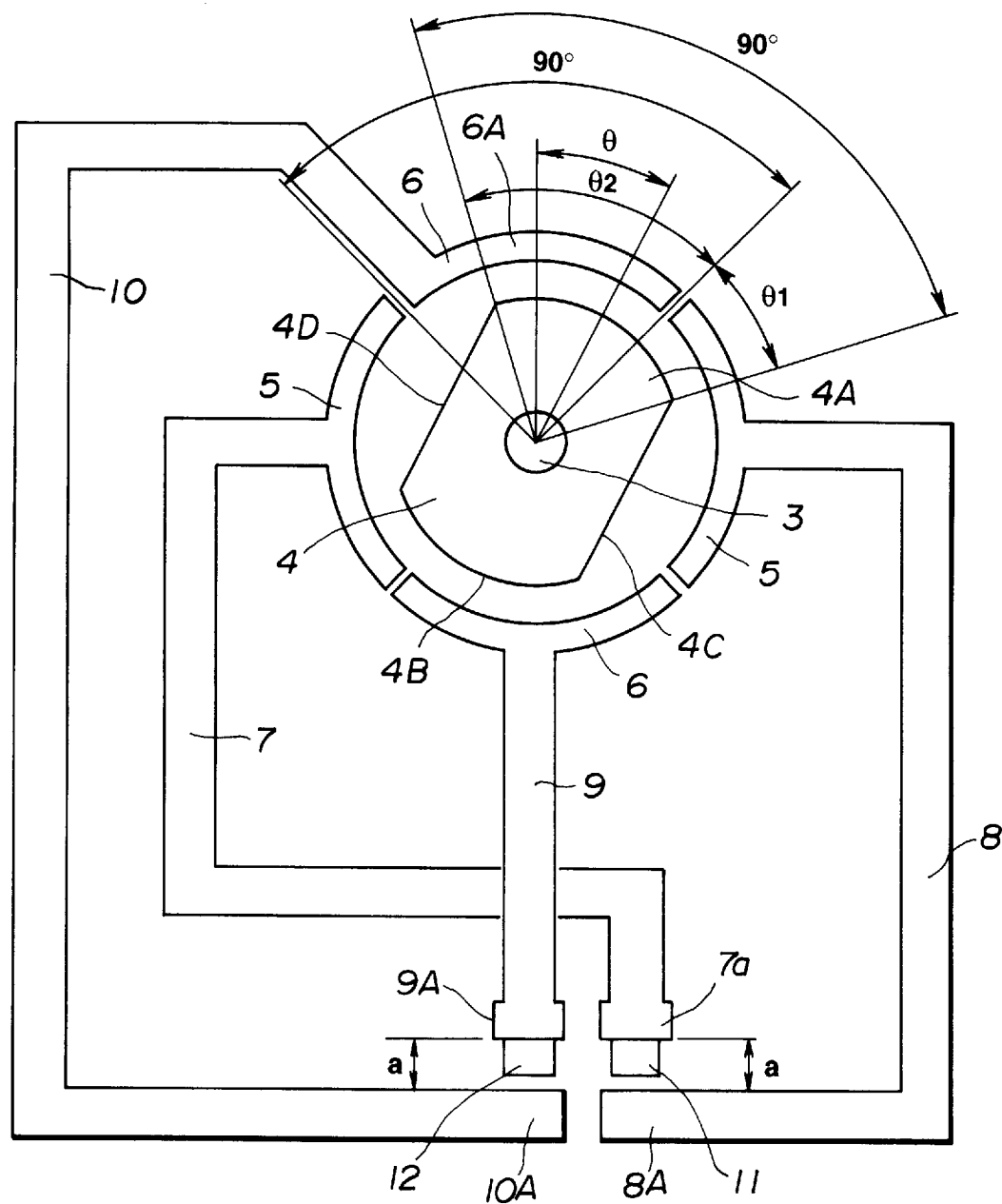
FIG. 4 is a block diagram of the rotation angle sensor of the first embodiment, showing a positional relationship between various parts of the same.

As is understood from FIGS. 1 and 4, the leading end 7A of the magnetic path forming portion 7 faces toward the leading end 8A of the other magnetic path forming portion 8. As shown in FIG. 1, between the two leading ends 7A and 8A, there are arranged the first Hall-element 11 and the circuit substrate 13.

Denoted by numerals 9 and 10 are the second magnetic path forming portions which have base ends integrally connected to the second magnetic piece portions 6 and 5 and leading end portions projected into the circular recess 1C of the casing 1.

As is seen from FIG. 1, the leading end portion of the magnetic path forming portion 9 is positioned above the first Hall-element 11 and the leading end portion of the other magnetic path forming portion 10 extends on the wall portion 1B of the casing 1 along the back surface of the circuit substrate 13.

As is understood from FIGS. 1 and 4, the leading end 9A of the magnetic path forming portion 9 faces toward the leading end 10A of the other magnetic path forming portion 10. As shown in FIG. 1, between the two leading ends 9A and 10A, there are arranged an after-mentioned second Hall-element 12 and the circuit substrate 13.

As is seen from FIG. 4, the facing area between the leading ends 7A and 8A of the magnetic path forming portions 7 and 8 is equal to that between the leading ends 9A and 10A of the other magnetic path forming portions 9 and 10. Furthermore, the distance "a" between the leading ends 7A and 8A is equal to that between the leading ends 9A and 10A.

As is seen from FIG. 1, the first and second Hall-elements 11 and 12 are disposed on the circuit substrate 13 in a manner to make a parallel arrangement therebetween. As is understood from FIG. 4, the first Hall-element 11 is located between the leading ends 7A and 8A of the magnetic path forming portions 7 and 8 to output a first voltage signal E1 in proportion to the density of the magnetic flux created between the leading ends 7A and 8A. While, the second Hall-element 12 is located between the leading ends 9A and 10A of the magnetic path forming portions 9 and 10 to output a second voltage signal E2 in proportion to the density of magnetic flux created between the leading ends 9A and 10A.

The circuit substrate 13 has an after-mentioned arithmetic circuit 19 installed therein together with the first and second Hall-elements 11 and 12. On the circuit substrate 13, the first or second Hall-element 11 or 12 is located between the leading end 7A or 8A of the magnetic path forming portion 7 or 8 and the leading end 9A or 10A of the magnetic path forming portion 9 or 10, as has been mentioned hereinabove. The circuit substrate 13 has a plurality of terminal pins 14 fixed thereto.

As shown in FIG. 1, each terminal pin 14 has a bent base end piercing the circuit substrate 13 and a leading end projected into a bore of a male connector 15. The male connector 15 is rectangular in shape and integral with the plastic casing 1. When a female connector (not shown) is coupled with the male connector 15, the electric circuit arranged on the circuit substrate 13 becomes electrically connected to an external electric device (not shown), such as a power source and the like, to which the female connector leads. As will be described hereinafter, a signal "So" (see FIG. 3) produced by the arithmetic circuit 19 is led to an external device.

Designated by numeral 16 is a plastic cover which is connected to the casing 1 to hermetically seal the circular recess 1C of the same. For this sealing, a rubber packing 17 or the like is employed.

Designated by numeral 18 is a magnetic shielding plate embedded in the wall portion 1B of the casing 1. As shown, the magnetic shielding plate 18 is positioned just below the first and second Hall-elements 11 and 12 on the circuit substrate 13. That is, due to provision of such plate 18, the first and second Hall-elements 11 and 12 are protected from being directly affected by the magnetic plate 4.

Figure 3:
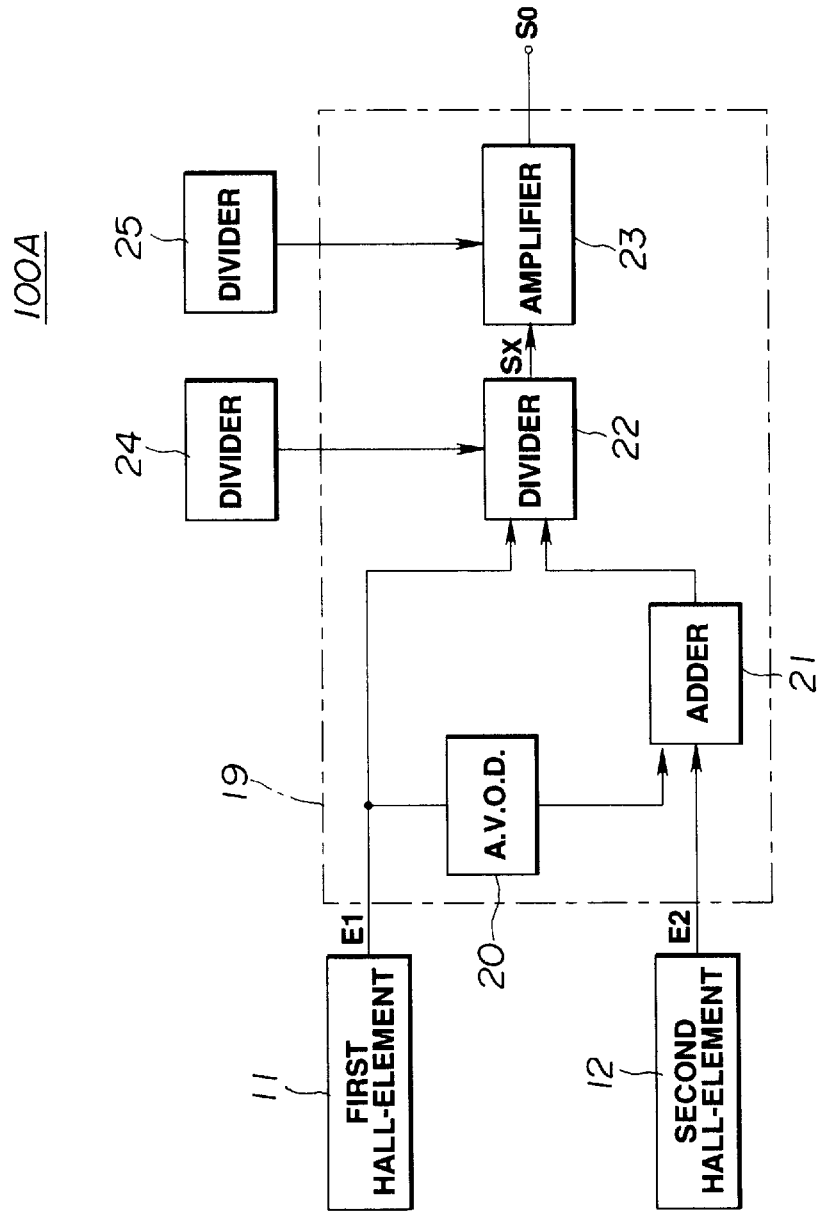
FIG. 3 is a block diagram of an electric circuit employed in the rotation angle sensor of the present invention.

As is seen from FIG. 3, the arithmetic circuit 19 processes voltage signals "E1" and "E2" issued from the first and second Hall-elements 11 and 12 and outputs a signal "So" which represents a rotation angle of the throttle valve shaft 3. The arithmetic circuit 19 comprises generally an absolute value output device 20, an adder 21, a divider 22 and an amplifier 23.

The absolute value output device 20 outputs an absolute value of the first voltage signal E1 which is issued from the first Hall-element 11. The adder 21 adds the absolute value from the device 20 and the second voltage signal E2 from the second Hall-element 12. The divider 22 derives a ratio between the output from the adder 21 and the output E1 from the first Hall-element 11. The amplifier 23 amplifies the output from the divider 22. The amplifier 23 is electrically connected to the terminal pins 14 to output a detecting signal "So" which represents the rotation angle of the throttle valve shaft 3.

In FIG. 3, denoted by numeral 24 is a reference voltage generator which determines an offset level for the output of the divider 22, and denoted by numeral 25 is a correcting signal generator which corrects the output of the amplifier 23 so that the output has a linear characteristic.

In the following, operation of the rotation angle sensor 100A of the first embodiment will be described with reference to the drawings, particularly FIGS. 4 to 8.

As is seen from FIG. 4, with rotation of the throttle valve shaft 3 by a rotation angle "θ", the arcuate edge 4A of the magnet plate 4 moves around the axis of the shaft 3 by an angular of ±90° from an intermediate portion 6A of the magnetic piece portion 6. When the magnet plate 4 rotates in the positive direction, that is, clockwise in the drawing, the arcuate edge 4A is allowed to face the magnetic piece portion 5 by an angular range "θ1" and face the magnetic piece portion 6 by an angular range of "θ2". During this, the other arcuate edge 4B is allowed to face the other magnetic piece portion 5 by an angular range "θ1" and face the other magnetic piece portion 6 by an angular range of "θ2". The magnetic flux produced by the magnet plate 4 is led to the first Hall-element 11 through the first magnetic piece portions 5 and 5 and the first magnetic path forming portions 7 and 8, and at the same time, the magnetic flux is led to the second Hall-element 12 through the second magnetic piece portions 6 and 6 and the second magnetic path forming portions 9 and 10.

Figure 5:
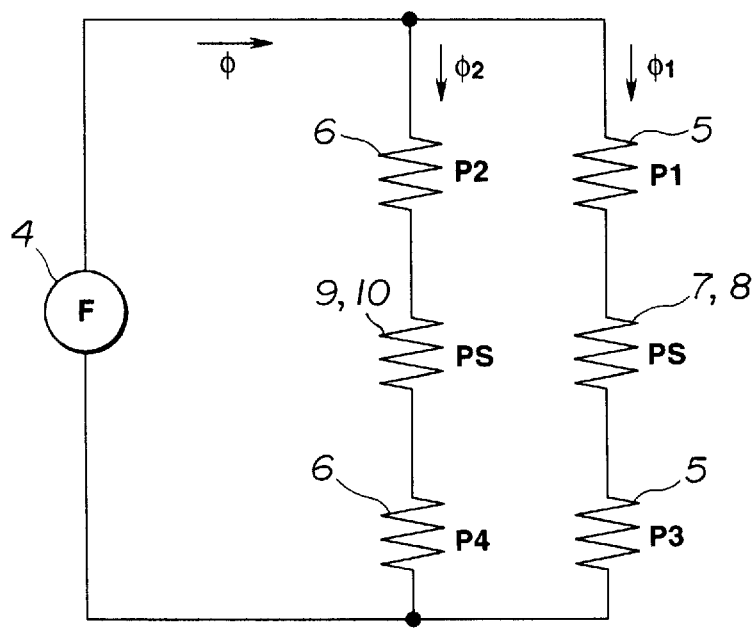
FIG. 5 is a magnetic circuit provided by the rotation angle sensor of the first embodiment.
Figure 6:
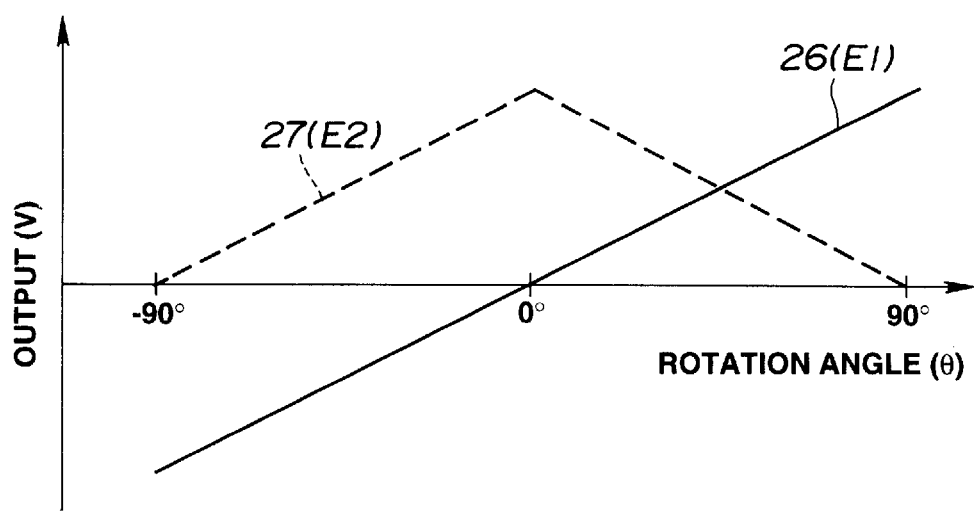
FIG. 6 is a graph showing a relationship between an output voltage of each of first and second Hall-elements employed in the sensor of the first embodiment and a rotation angle to be sensed.

As is seen from FIGS. 4 and 5, under this condition, the magnet plate 4, the magnetic piece portions 5 and 5, and the first magnetic path forming portions 7 and 8 constitute a first magnetic circuit, and the magnet plate 4, the second magnetic piece portions 6 and 6 and the second magnetic path forming portions 9 and 10 constitute a second magnetic circuit. These two magnetic circuits are arranged in a manner as shown.

When the inverse value of a magnetic resistance between the arcuate edge 4A of the magnetic plate 4 and each of the magnetic piece portions 5 and 6 is represented by a permeance P1 or P2, the permeance P1 and the permeance P2 are derived from the following equations:

$$P1 = \alpha \times \mu 0 \times \theta 1 \quad (1)$$
$$= \alpha \times \mu 0 \times \theta$$
$$P2 = \alpha \times \mu 0 \times \theta 2 \quad (2)$$
$$= \alpha \times \mu 0 \times (90° - \theta)$$

That is, the permeance P1 or P2 is proportional to the facing area through which the arcuate edge 4A of the magnetic plate 4 and each of the first and second magnetic piece portions 5 and 6 faces.

In the above equations, the value α is a constant value which is determined by the axial length of the magnet plate 4, the axial length of each of the magnetic piece portions 5 and 6 and the distance between the magnet plate 4 and each of the magnetic piece portions 5 and 6. The value "$\mu 0$" represents a magnetic permeability in vacuum.

When the inverse value of a magnetic resistance between the other arcuate edge 4B of the magnet plate 4 and each of the other magnetic piece portions 5 and 6 is represented by a permeance P3 or P4, the permeance P3 and P4 are derived from the following equations.

$$P3 = \alpha \times \mu 0 \times \theta 1 = P1 \qquad (3)$$

$$P4 = \alpha \times \mu 0 \times \theta 2 = P2 \qquad (4)$$

When the inverse value of a magnetic resistance value around the first and second Hall elements 11, 12 is represented by a permeance PS, the fact wherein the permeance PS is quite small as compared with the permeance P1, P2, P3 or P4 of the first and second magnetic piece portions 5 and 6 makes the value of the permeance PS negligible.

Accordingly, the total "φ" of the magnetic flux produced based on the magnetomotive force F of the magnet plate 4 and passing through the first and second magnetic circuits is always constant as is represented by the following equation.

$$\begin{aligned}\varphi &= F/((1+P1)+(1/P3))+F/((1/P2)+(1/P4)) \\ &= F \times (P1+P2)/2 \\ &= F \times \alpha \times \mu 0 \times 90°/2\end{aligned} \qquad (5)$$

The magnetic flux φ1, φ2 passing through the magnetic piece portion 5, 6 has the following connections.

$$\varphi 1 : \varphi 2 = P1 : P2 \qquad (6)$$

$$\begin{aligned}\varphi 1 &= \varphi \times \varphi 1/(P1+P2) \\ &= \varphi \times \alpha \times \mu 0 \times \theta /(\alpha \times \mu 0 \times 90°) \\ &= \varphi \times \theta /90°\end{aligned} \qquad (7)$$

$$\begin{aligned}\varphi 2 &= \varphi \times P2/(P1+P2) \\ &= \varphi \times \alpha \times \mu 0 \times (90° - \theta)/(\alpha \times \mu 0 \times 90°) \\ &= \varphi \times (1-\theta/90°)\end{aligned} \qquad (8)$$

Since the facing area through which the leading ends 7A and 8A of the magnetic path forming portions 7, 8 face each other is equal to the facing area through which the leading ends 9A, 10A of the magnetic path forming portions 9, 10 face each other, the density B1 or B2 of the magnetic flux passing through the first or second Hall element 11, 12 is represented by the following equations wherein β represents a constant.

$$B1 = \beta \times \varphi 1 \qquad (9)$$

$$B2 = \beta \times \varphi 2 \qquad (10)$$

Since the Hall-elements 11, 12 have identical characteristics and the output voltage E1 or E2 of the Hall element 11 or 12 is proportional to the density of magnetic flux B1 or B2, the following equations are obtained.

$$\begin{aligned}E1 &= G \times B1 \\ &= G \times \beta \times \varphi \times \theta/90°\end{aligned} \qquad (11)$$

$$\begin{aligned}E2 &= G \times B2 \\ &= G \times \beta \times \varphi \times (1 - \theta/90°)\end{aligned} \qquad (12)$$

In these equations, G denotes the sensitivity of the Hall-element 11, 12, which determines the output voltage E1, E2 with respect to the density B1, B2 of magnetic flux.

Furthermore, the output voltage E2 of the Hall-element 12 can be represented by the following equation.

$$\begin{aligned}E2 &= G \times B2 \\ &= G \times \beta \times \varphi \times (1 - |\theta|/90°)\end{aligned} \qquad (13)$$

That is, the equation 12 can be replaced by the equation 13.

As a result, from the equation 11, it will be understood that the output voltage E1 of the Hall-element 11 is proportional to the rotation angle "θ". That is, as is seen from the characteristic line 26 of FIG. 6, with increase of the rotation angle θ, the output voltage E1 increases. When the rotation angle θ is −90°, the output voltage E1 shows the negative maximum value because under such condition one magnetic piece portion 5 faces the arcuate edge 4B of the magnet plate 4 and the other magnetic piece portion 5 faces the arcuate edge 4A of the magnet plate 4 therethroughout. When now the magnet plate 4 is rotated in a positive direction, the facing area between the magnetic piece portion 5, 5 and the arcuate edge 4A, 4B of the magnet plate 4 is reduced. In proportion to the facing area thus reduced, the output voltage E1 is reduced, and when the rotation angle θ is 0°, the output voltage E1 becomes almost 0V (volt).

When, then, the magnet plate 4 is rotated in a positive direction, the polarity of the magnet plate 4 which faces the magnetic piece portions 5, 5 becomes reversed causing one magnetic piece portion 5 to face the arcuate edge 4A of the magnet plate 4 and causing the other magnetic piece portion 5 to face the arcuate edge 4B of the magnet plate 4. Thus, the output voltage E1 exhibits a positive value. Since the facing area between the magnetic piece portions 5, 5 and the arcuate edges 4A, 4B of the magnet plate 4 increases with increase of the rotation angle θ, the output voltage E1 is increased in proportion to the facing area. When the rotation angle θ becomes 90°, the output voltage E1 exhibits the maximum positive value.

From the equation 13, it will be understood that the output voltage E2 from the Hall-element 12 has two outstanding features. That is, as is seen from the dotted characteristic line in FIG. 6, when the rotation angle θ is −90°, the output voltage E2 is about 0V (volt) because under this condition, the magnetic piece portion 6, 6 does not face the arcuate edge 4A, 4B of the magnet plate 4. When now the magnet plate 4 is rotated in the positive direction, the output voltage E2 is increased because the facing area between the magnetic piece portion 6, 6 and the arcuate edge 4A, 4B of the magnet plate 4 increases. When the rotation angle θ is 0°, the output voltage E2 exhibits the maximum value. When then the magnet plate 4 is further rotated in the positive direction, the facing area between the magnetic piece portion 6, 6 and the arcuate edge 4A, 4B of the magnet plate 4 is reduced and thus the output voltage E2 is reduced. When the rotation angle φ becomes 90°, the output voltage E2 becomes about 0V (volt).

The sensitivity G of the Hall-elements 11, 12 is affected by the surrounding temperature, and thus the output voltage E1, E2 is varied accordingly. Since the total magnetic flux "F" depends upon the magnetomotive force F of the magnet plate 4, the output voltage E1, E2 is varied while being affected by the magnetomotive force "F" of the magnet plate 4.

For compensating the above, the output voltage E1, E2 is inputted to the calculating circuit 19, and the following calculation is carried out in the calculation circuit 19.

$$Sx = E1/(|E1| + E2) = \theta/90° \qquad (14)$$

That is, the absolute value output device 20 of the calculating circuit 19 derives the absolute value |E1| of the output voltage E1, and the adder 21 derives an added value (|E1|+E2) by adding the absolute value |E1| and the value of the output voltage E2. The divider 22 effects the equation 14, that is, divides the output voltage E1 by the added value (|E1|+E2) to output the signal Sx.

Figure 7:
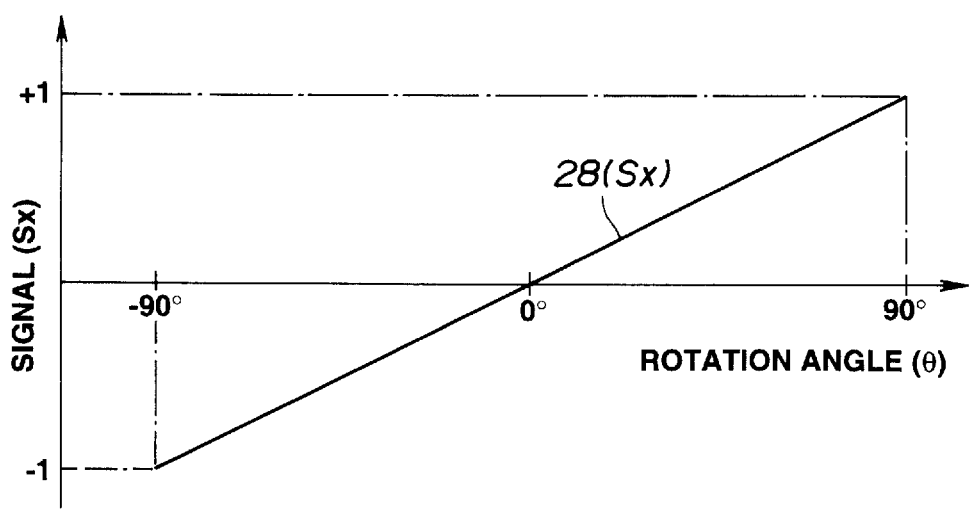
FIG. 7 is a graph showing a relationship between a signal from a divider employed in the sensor of the first embodiment and a rotation angle to be sensed.

With this, the signal Sx has such a characteristic as shown by a characteristic solid line 28 in FIG. 7, and thus when the rotation angle θ is −90°, the signal Sx exhibits the minimum value (Sx=−1), and when the rotation angle θ is 90°, the signal Sx exhibits the maximum value (Sx=1). That is, the characteristic of the signal Sx is determined by only the rotation angle θ, that is, the signal Sx is not affected by the magnetomotive force F of the magnet plate 4 and the sensitivity G of the Hall-elements 11, 12.

Referring back to FIG. 3, the base voltage generator 24 feeds the divider 22 with a base voltage, the amplifier 23 amplifies the signal Sx issued from the divider 22, and the correcting signal generator 25 feeds the amplifier 23 with a correcting signal to allow the amplifier 23 to issue a corrected amplified signal So.

That is, based on the signal Sx, the signal So is obtained from the following equation.

$$\begin{aligned} So &= k \times Sx + Vo \\ &= (k \times \phi)/90° + Vo \end{aligned} \quad (15)$$

Vo is a constant voltage (for example, 2.5V), and the constant k represents an amplification factor.

Figure 8:
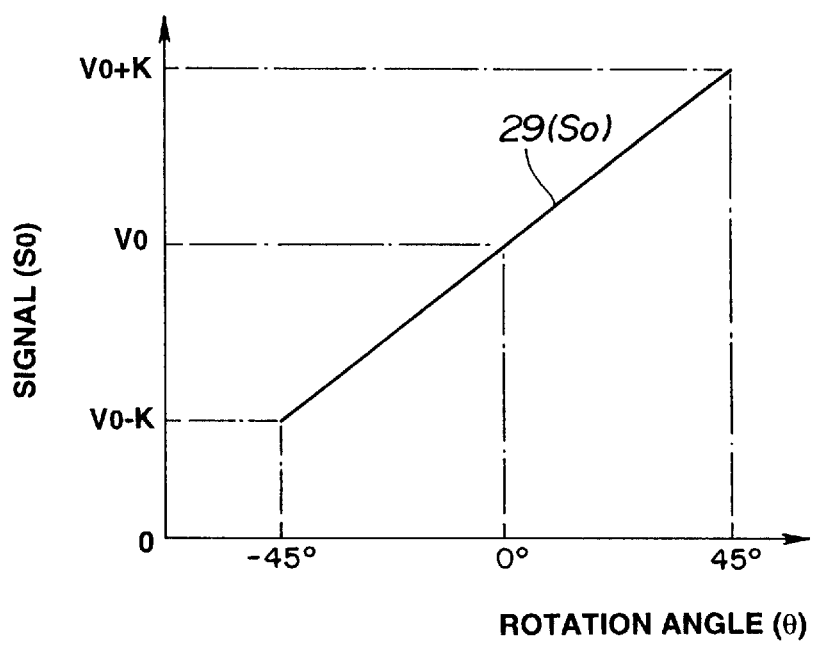
FIG. 8 is a graph showing a relationship between a signal from an arithmetic circuit employed in the sensor of the first embodiment and a rotation angle to be sensed.

With the above, the signal So has such a characteristic as is shown by the solid characteristic line 29 in FIG. 8. That is, when the rotation angle θ is −45°, the signal So exhibits the minimum value (So=Vo−k), and when the rotation angle θ is 45°, the signal So exhibits the maximum value (So= Vo+k).

The rotation angle sensor 100A of the above-mentioned first embodiment has the following advantages.

The first and second magnetic piece portions 5, 6 are spaced from the throttle valve shaft 3 and the magnet plate 4. That is, the piece portions 5, 6 are not in contact with them. Thus, detection of the rotation angle θ of the shaft 3 is carried out smoothly without being affected by undesired frictional resistance which would be produced if the piece portions 5, 6 contact the shaft 3 and the magnet plate 4. That is, with a so-called non-contact arrangement, not only durability but also sensitivity of the rotation detecting device 100A is increased. In fact, there is no possibility of encountering such an undesired state that the output voltage E1, E2 from the first or second Hall-element 11, 12 is cut off momentarily.

As is seen from the equation 15, the arithmetic circuit 19 can output the corrected amplified signal So which precisely represents the rotation angle θ of the throttle valve shaft 3. Thus, precise detection of the rotation angle θ is carried out without being affected by the magnetomotive force F of the magnet plate 4 and the temperature characteristic of the sensitivity of Hall-elements 11, 12.

The magnetic flux generated by the magnet 4 is led from the first magnetic piece portions 5, 5 to the first Hall-element 11 through the magnetic path forming portions 7, 8, and the same is led from the second magnetic piece portions 6, 6 to the second Hall-element 12 through the magnetic path forming portions 9, 10. Thus, the first Hall-element 11 can output an output voltage E1 in accordance with the magnetic flux φ 1 produced by the magnet plate 4 between the first magnetic piece portions 5 and 5, and the second Hall-element 12 can output an output voltage E2 in accordance with the magnetic flux φ 2 produced by the magnet plate 4 between the second magnetic piece portions 5 and 6. Furthermore, the level of the output voltage E1, E2 from the first and second Hall-elements 11, 12 can be largely varied in accordance with the rotation angle θ of the magnet plate 4.

Due to provision of the magnetic path forming portions 7, 8, 9, 10, the magnetic flux produced by the magnet plate 4 can be effectively led to the first and second Hall-elements 11, 12, and thus, the freedom in mounting the Hall-elements 11, 12 is increased. Furthermore, since the first and second Hall-elements 11, 12 are closely arranged, it is possible to allow them to encounter the same external conditions.

The first and second magnetic piece portions 5, 6 are arranged to form a divided cylindrical shape which is concentric with the throttle valve shaft 3. Thus, the distance between each arcuate edge 4A, 4B of the magnet plate 4 and the magnetic piece portion 5, 6 can be kept constant even under rotation of the magnet plate 4. With this, it is possible to lead from the first magnetic piece portions 5 and 5, a magnetic flux φ 1 which is proportional to the facing area between the first magnetic piece portion 5, 5 and the arcuate edge 4A, 4B of the magnet plate 4, and thus it is possible to get from the first Hall-element 11, an output voltage E1 which is proportional to the rotation angle θ of the shaft 3. In addition to this, it is possible to lead from the second magnetic piece portions 6 and 6 a magnetic flux φ 2 which is proportional to the facing area between the second magnetic piece portion 6, 6 and the arcuate edge 4A, 4B of the magnet 4, and thus, it is possible to get from the second Hall-element 12, an output voltage E2 which is proportional to the rotation angle θ of the shaft 3.

Since the magnet plate 4 and the magnetic piece portions 5, 6 can be concentrically arranged, downsizing of the rotation angle sensor 100A is possible. Furthermore, since the shaft 3 has only the magnet plate 4 fixed thereto, assembly of the rotation angle sensor 100A is simplified.

Figure 9:
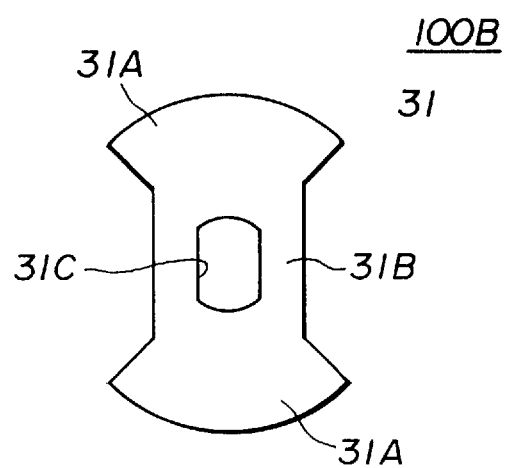
FIG. 9 is a plan view of a magnet employed in a rotation angle sensor of a second embodiment of the present invention.

Referring to FIG. 9, there is shown a magnet plate 31 which is employed in a rotation angle sensor 100B of a second embodiment of the present invention.

As shown, the magnet plate 31 of this second embodiment comprises diametrically opposed sectoral portions 31A and 31A and a rectangular middle portion 31B. The middle portion 31B is formed with a slot 31C with which the shaft 3 of the throttle valve is engaged.

Similar to the magnet plate 4 of the above-mentioned first embodiment 100A, the arcuate edge of each sectoral portion 31A extends by an angle of 90° around the axis of the shaft 3. The two sectoral portions 31A and 31A possess N-pole and S-pole respectively.

Due to similar construction to the above-mentioned first embodiment 100A, the rotation angle sensor 100B of this second embodiment has substantially the same advantages as those of the first embodiment 100A. In addition to these advantages, the following advantage is further possessed by the second embodiment 100B.

That is, due to the nature of the shape of the magnet plate 31, the magnetic flux of the magnet plate 31 can expand widely from each sectoral portion 31A by an angular range of 90°. Accordingly, even when the rotation angle θ becomes near ±90° or 0 (zero), it is possible to precisely lead, from the magnet plate 31 to the first and second Hall-elements 11, 12, a magnetic flux which is proportional to the facing area between the first and second magnetic piece portions 5, 6 and the sectoral portions 31A, 31A of the magnet plate 31. Thus, precise detection of the rotation angle θ is carried out throughout all rotation range of the throttle valve shaft 3.

Figure 10:
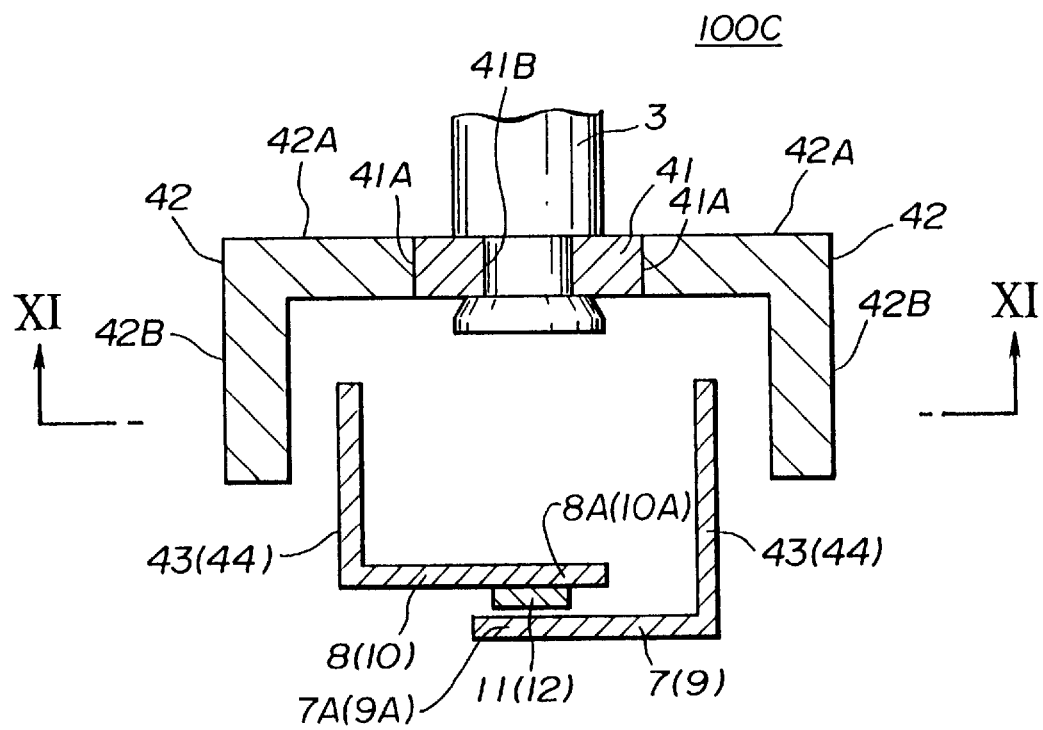
FIG. 10 is a vertically sectional view of a rotation angle sensor which is a third embodiment of the present invention.
Figure 11:
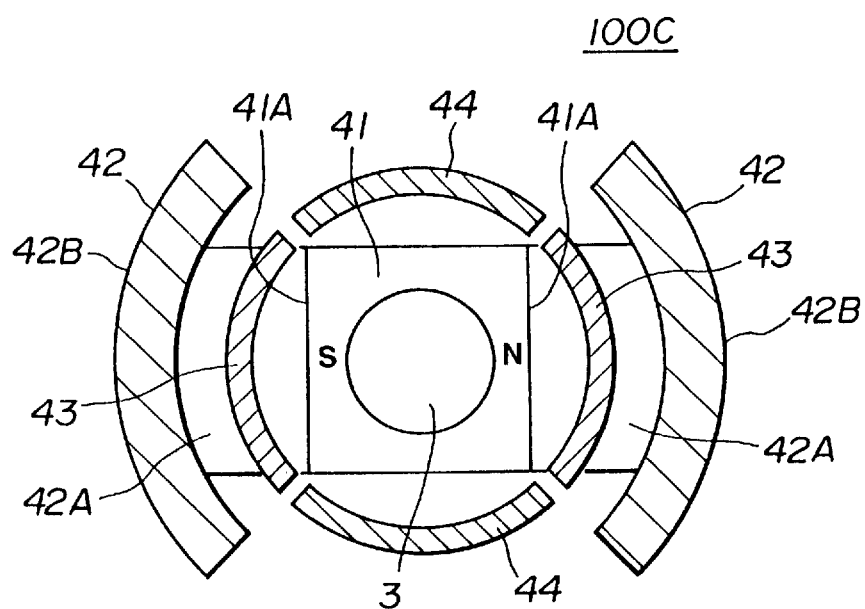
FIG. 11 is a sectional view taken along the line XI—XI of FIG. 10.

Referring to FIGS. 10 and 11, there is shown essential parts of a rotation angle sensor 100C of a third embodiment of the present invention. For ease of description, the parts which are substantially the same as those of the above-mentioned first embodiment 100A are denoted by the same numerals and explanation of them will be omitted from the following.

In this third embodiment 100C, to both ends of a magnet plate 41 fixed to the throttle valve shaft 3, there are mounted magnetic pieces 42, 42. Leading end portions of the magnetic pieces 42, 42 are arranged to face first and second magnetic piece portions 43, 44.

The magnetic plate 41 fixed to the shaft 3 is generally square in shape, and has opposed parallel surface portions 41A, 41A which possess N-pole and S-pole respectively. The magnet plate 41 is formed at a center thereof with a bore 41B to which the shaft 3 is tightly fixed.

Each magnetic piece 42 comprises an arm portion 42A which has a base end connected to the surface portion 41A of the square magnet plate 41 and extends in a radial direction and a semi-cylindrical portion 42B which projects from the leading end of the corresponding arm portion 42A in a direction parallel to the axis of the shaft 3.

As is understood from FIG. 11, each semi-cylindrical portion 42B extends around the axis of the shaft 3 within an angular range of 90°. The concave inside surface of each semi-cylindrical portion 42B can face the convex outside surface of the first and second magnetic piece portions 43, 44.

As shown in FIG. 10, the first magnetic piece portions 43, 43 and the second magnetic piece portions 44, 44 are all placed inside the semi-cylindrical portions 42B, 42B.

As is seen from FIG. 11, the first magnetic piece portions 43, 43 are symmetrically arranged with respect to the axis of the shaft 3, and each magnetic piece portion 43 extends around the axis of the shaft 3 by an angular range of 90°. The second magnetic piece portions 44, 44 are also symmetrically arranged with respect to the axis of the shaft 3, and each magnetic piece portion 44 extends around the axis of the shaft 3 by an angular range of 90°.

As is understood from FIG. 11, the first and second magnetic piece portions 43, 44 are alternatively arranged to constitute a divided cylindrical shape which is concentric with the shaft 3.

Similar to the above-mentioned first embodiment, to the first and second magnetic piece portions 43, 44, there are integrally connected base ends of first and second magnetic path forming portions 7, 8, 9, 10. Between leading ends 7A, 8A of the magnetic path forming portions 7, 8, there is arranged a first Hall-element 11, and between leading ends 9A, 10A of the magnetic path forming portions 9, 10, there is arranged a second Hall-element 12.

With the arrangement as mentioned hereinabove, the third embodiment 100C has substantially the same advantages as the above-mentioned first embodiment. In addition to the advantages, the third embodiment 100C has the following advantages.

That is, due to provision of the magnetic pieces 42, 42 fixed to the magnetic plate 41, it is possible to concentrate a magnetic flux of the magnet plate 41 between the semi-cylindrical portions 42B, and thus leakage of the magnetic flux is reduced. Accordingly, the magnetic flux can be much more effectively led to the first and second Hall-elements 11, 12 from the first and second magnetic piece portions 43, 44, and thus, the detecting sensitivity for the rotation angle is much increased.

Figure 12:
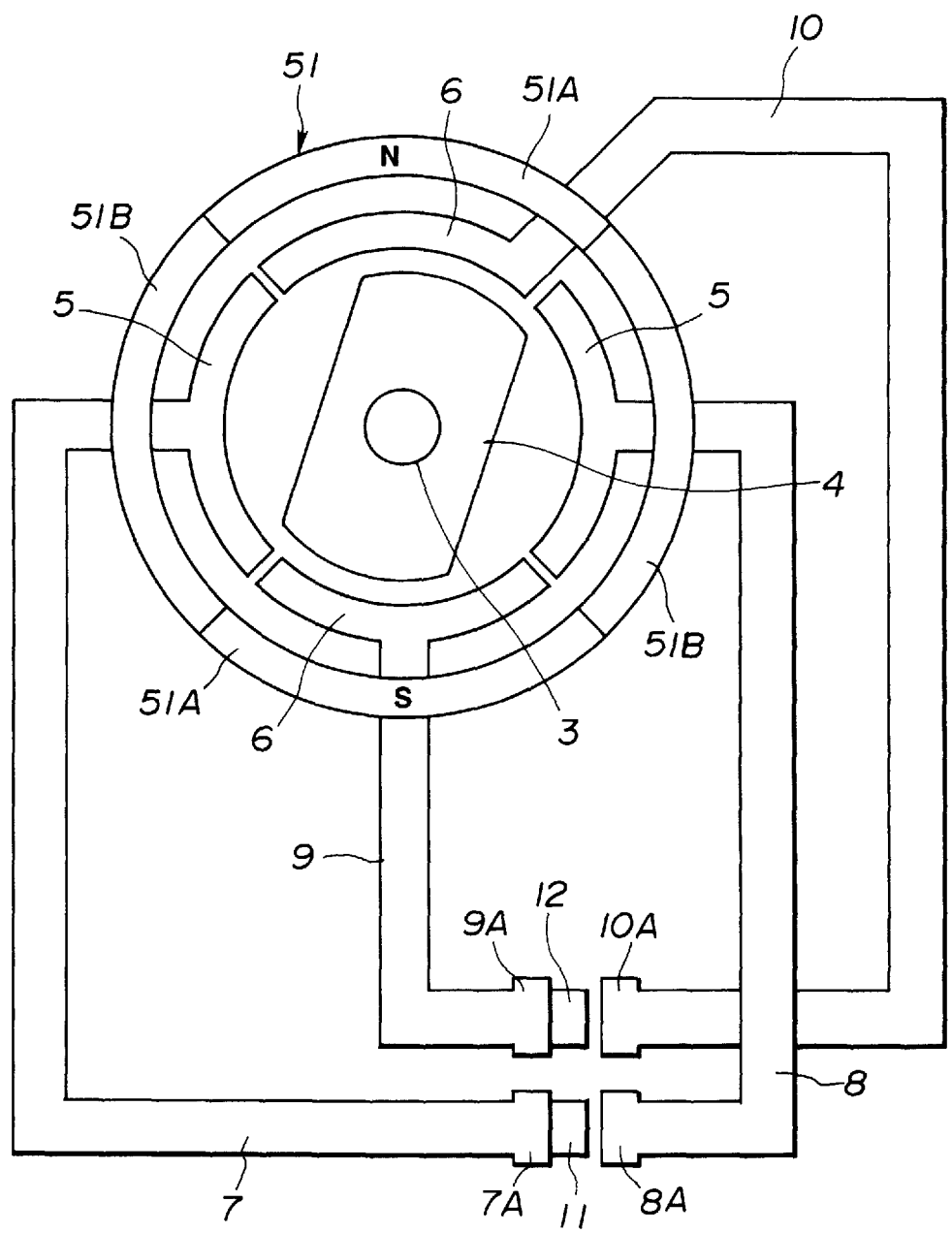
FIG. 12 is a block diagram of a rotation angle sensor of a fourth embodiment of the invention, showing various parts of the same.

Referring to FIG. 12, there is shown a block diagram of a rotation angle sensor 100D of a fourth embodiment of the present invention. For ease of description, the parts which are substantially the same as those of the above-mentioned first embodiment 100A are denoted by the same numerals and explanation of them will be omitted from the following.

In this fourth embodiment 100D, there is further employed a magnetic ring 51 which is arranged to be concentric with the throttle valve shaft 3. Although not shown in the drawing, the ring 51 is connected to the shaft 3 to rotate therewith.

As shown, the ring 51 comprises two diametrically opposed arcuate magnetic pieces 51A, 51A and two diametrically opposed non-magnetic pieces 51B, 51B. Each arcuate magnetic piece extends around the axis of the shaft 3 by an angular range of 90°. One arcuate magnetic piece 51A has an inner surface presenting N-pole, and the other arcuate magnetic piece 51A has an inner surface presenting S-pole.

As shown, the ring 51 is arranged to surround the first and second magnetic piece portions 5, 6.

With the arrangement as mentioned hereinabove, the fourth embodiment 100D has substantially the same advantages as the above-mentioned third embodiment 100C. In addition to the advantages, the fourth embodiment 100D has the following advantages.

That is, due to the nature of the ring 51, the same can be constructed light in weight, which reduces a load applied to the shaft 3. Thus, sensitivity of the rotation angle sensor 100D is improved.

Referring to FIGS. 13 to 19, particularly FIGS. 13 to 17, there is shown a rotation angle sensor 100E which is a fifth embodiment of the invention.

Figure 13:
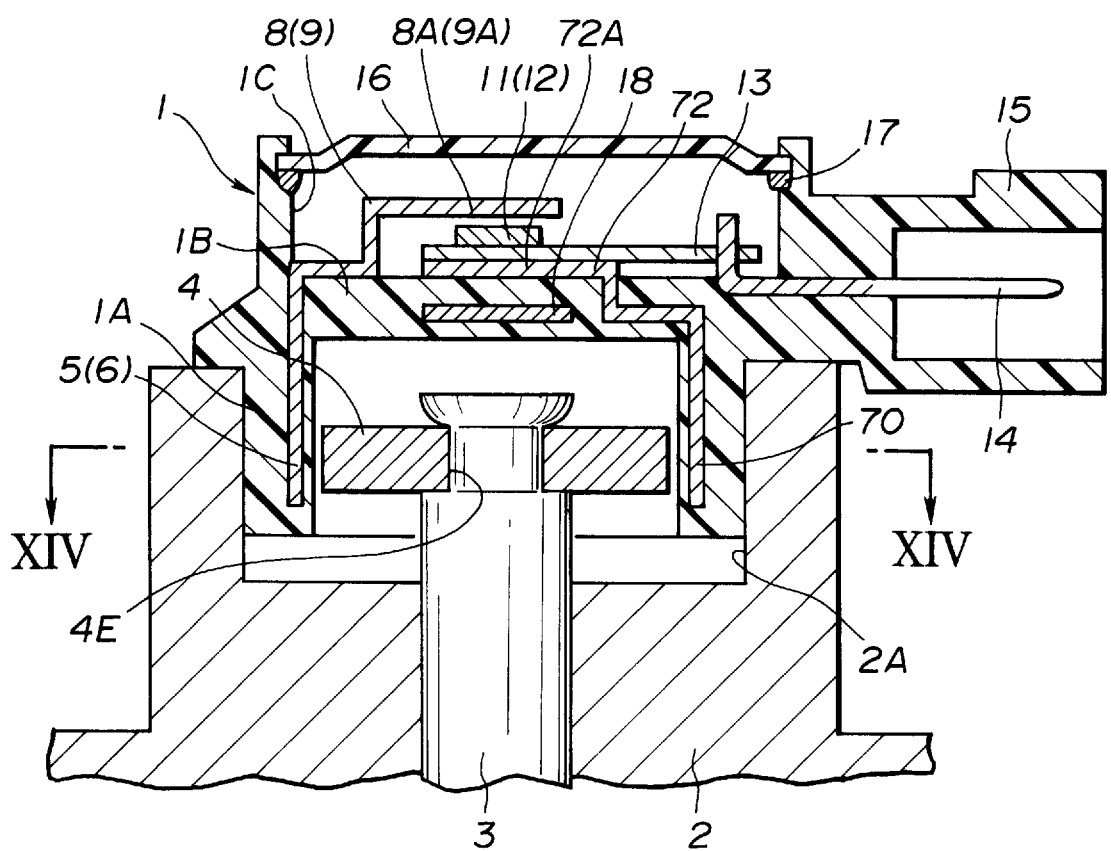
FIG. 13 is a view similar to FIG. 1, but showing a rotation angle sensor of a fifth embodiment of the present invention.
Figure 14:
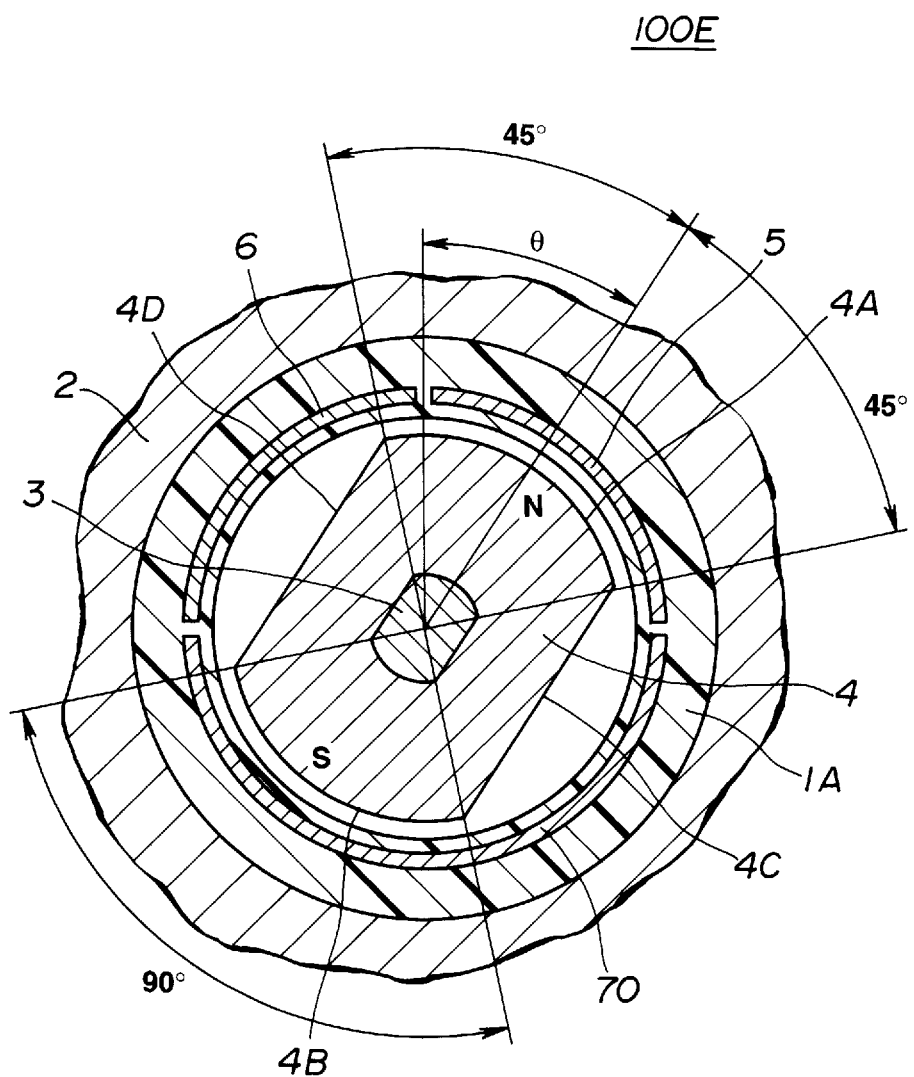
FIG. 14 is a view similar to FIG. 2, but showing the rotation angle sensor of the fifth embodiment.

As is seen from FIGS. 13 and 14, the rotation angle sensor 100E of this embodiment is similar to the sensor 100A of the above-mentioned first embodiment. Thus, parts which are substantially the same as those of the first embodiment are denoted by the same numerals, and detailed explanation of them will be omitted from the following.

Figure 15:
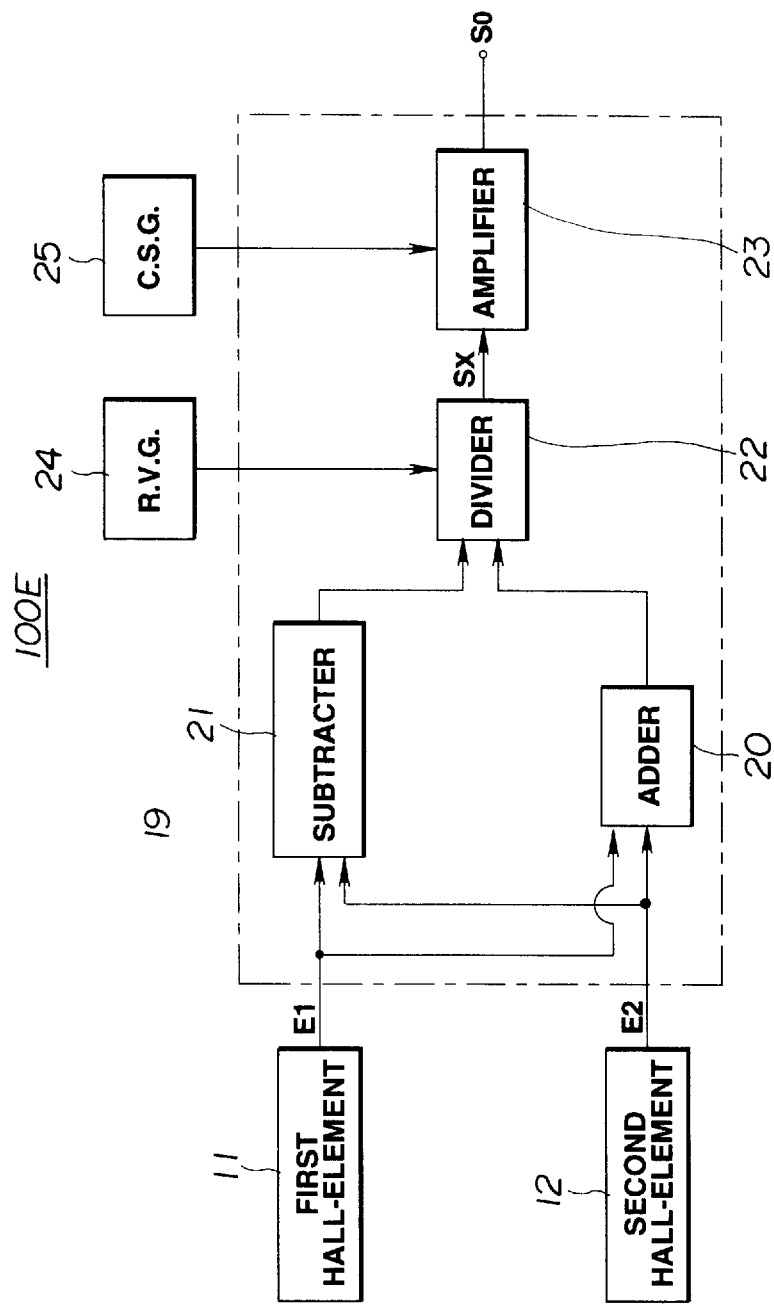
FIG. 15 is a block diagram of an electric circuit employed in the rotation angle sensor of the fifth embodiment.

As will be understood from FIGS. 14 and 15, in the fifth embodiment 100E, only one first magnetic piece portion 5 and only one second magnetic piece portion 6 are employed. Furthermore, in the fifth embodiment 100E, a larger third magnetic piece portion 70 is employed. These magnetic piece portions 5, 6 and 70 are all embedded in the tubular portion 1A of the plastic casing 1.

As shown in FIG. 14, these three magnetic piece portions 5, 6 and 70 are arranged to constitute a divided cylindrical structure which concentrically surrounds the magnet plate 4.

Each of the magnetic piece portions 5 and 6 extends around the axis of the shaft 3 by an angular range of 90°. The magnetic piece portion 5 is a means for leading a magnetic flux produced by the magnet plate 4 to a first Hall-element 11 through an after-mentioned first magnetic path forming portion 8, while the magnetic piece portion 6 is a means for leading the magnetic flux to a second Hall-element 12 through and after-mentioned second magnetic path forming portion 9.

The third magnetic piece portion 70 extends around the shaft 3 by an angular range of 180°. The third magnetic piece portion 70 is a means for leading the magnetic flux of the magnet plate 4 to the first and second Hall-elements 11, 12 through an after-mentioned third magnetic path forming portion 72 (see FIG. 16).

As is seen from FIG. 14, the rotation angle θ of the magnet plate 4 (that is, the rotation angle of the shaft 3) is determined with respect to a zero position (θ=0) where an intermediate part of the arcuate edge 4A of the magnet plate 4 faces to an intermediate position between the first and second magnetic piece portions 5 and 6. Furthermore, the direction in which the arcuate edge 4A of the magnet plate 4 shifts rightward in FIG. 14, that is, toward the first magnetic piece portion 5 is referred to as a positive direction, while, the direction in which the arcuate edge 4A shifts leftward in the drawing, that is, toward the second magnetic piece portion 6 is referred to as a negative direction. The angular range within which the shaft 3 can rotate is ±45°. That is, when the rotation angle θ is −45°, the throttle valve assumes a closed condition, while, when the rotation angle θ is 45°, the throttle valve assumes a full open condition.

Figure 16:
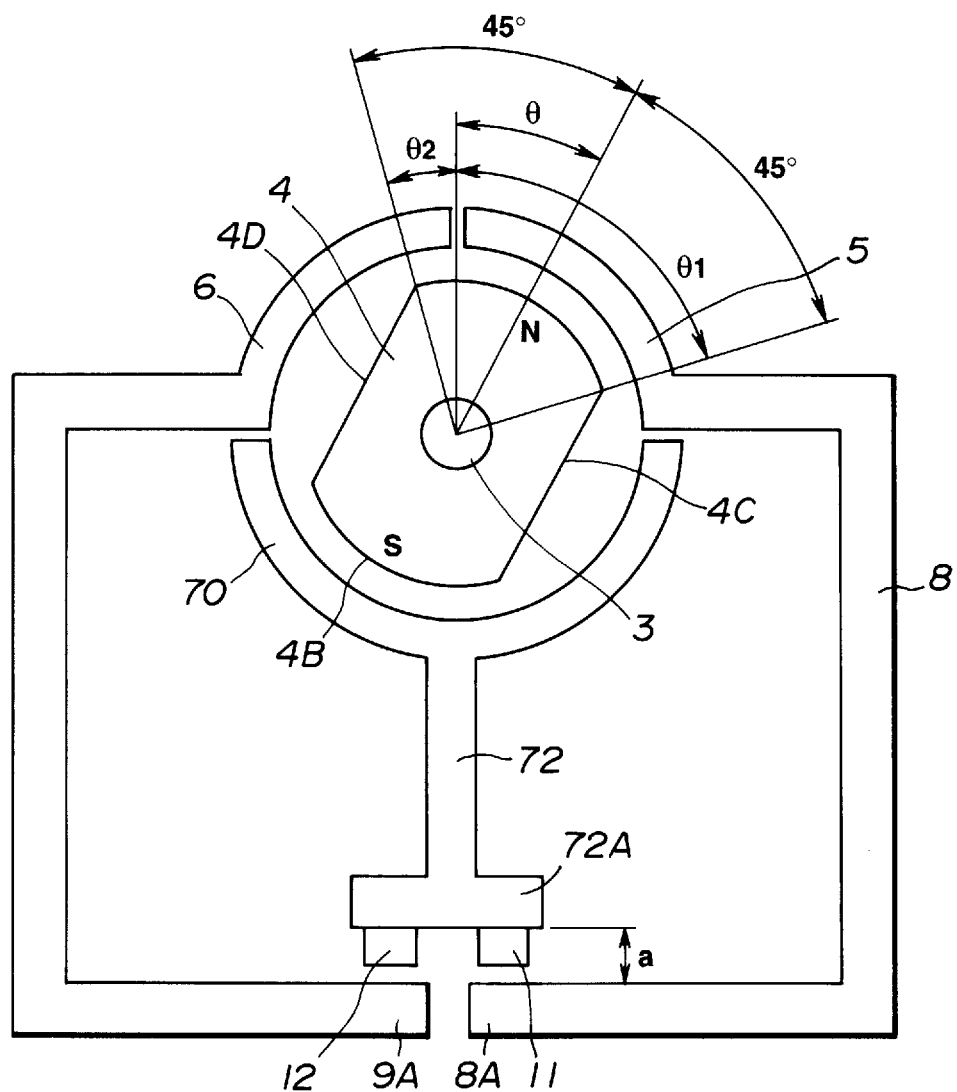
FIG. 16 is a block diagram of the rotation angle sensor of the fifth embodiment, showing a positional relationship between various parts of the same.

As is seen from FIGS. 16 and 13, the first magnetic path forming portion 8 has a base end connected to the first magnetic piece portion 5 and a leading end projected into a recessed portion 1C of the plastic casing 1.

As is seen from FIG. 13, similar to the first embodiment of FIG. 1, the leading end portion of the first magnetic path forming portion 8 is positioned above the first Hall-element 11 installed in the circular recess 1C of the casing 1. The second magnetic path forming portion 9 has a base end connected to the second magnetic piece portion 6 and a leading end projected into the recessed portion 1C of the casing 1. The leading end portion of the second magnetic path forming portion 9 is positioned above the second Hall-element 12 installed in the circular recess 1C of the casing 1.

As is understood from FIG. 16, the leading ends 8A, 9A of the magnetic path forming portions 8, 9 are placed near a leading end 72A of the third magnetic path forming portion 70.

It is to be noted that the facing area and the distance "a" between the leading end 8A and the leading end 72A are equal to those between the leading end 9A and the leading end 72A.

The third magnetic path forming portion 72 has a base end connected to the third magnetic piece portion 70 and a leading end projected into the recessed portion 1C of the casing 1. The leading end of the third magnetic path forming portion 72 extends on the wall portion 1B of the casing 1 along a back surface of an after-mentioned circuit substrate 13.

As is seen from FIGS. 13 and 16, between the leading end 72A of the third magnetic path forming portion 72 and the leading end 8A of the first magnetic path forming portion 8, there is arranged the first Hall-element 11. Between the leading end 72A and the leading end 9A of the second magnetic path forming portion 9, there is arranged the second Hall-element 12. The first and second Hall elements 11, 12 are arranged in parallel on the circuit substrate 13 and united to constitute a single unit.

The first Hall-element 11 outputs a first voltage signal "E1" which is proportional to the density of a magnetic flux between the leading end 72A and the leading end 8A, while, the second Hall-element 12 outputs a second voltage signal "E2" which is proportional to the density of a magnetic flux between the leading end 72A and 9A.

The circuit substrate 13 is positioned in the recessed portion 1C of the casing 1 and equipped with the first and second Hall-elements 11, 12 and a calculating circuit 19.

The calculating circuit 19 is mounted to the circuit substrate 13 to output, based on the outputs E1, E2 from the first and second Hall elements 11, 12, a signal "So" which represents the rotation angle of shaft 3.

As shown in FIG. 15, the calculating circuit 19 comprises an adder 20, a subtracter 21, a divider 22 and an amplifier 23.

The adder 20 adds the voltage signals E1, E2 from the first and second Hall elements 11, 12, the subtracter 21 carries out a subtraction to the voltage signals E1, E2 outputted from the first and second Hall-elements 11, 12, the divider 22 calculates the ratio between the output from the adder 20 and the output from the subtracter 21, and the amplifier 23 amplifies the output from the divider 22. The amplifier 23 is electrically connected to the terminal pins 14 so as to output the signal "So" to the external device (not shown).

Denoted by numeral 24 is a reference voltage generator which determines an offset level for the output of the divider 22, and denoted by numeral 25 is a correcting signal generator which corrects the output of the amplifier 23 so that the output has a linear characteristic.

In the following, operation of the rotation angle sensor 100E of the fifth embodiment will be described with reference to the drawings, particularly FIGS. 16 to 19.

As is shown in FIG. 16, with rotation of the shaft 3 by a rotation angle "θ", the arcuate edge 4A of the magnet plate 4 moves around the axis of the shaft 3 by an angular range of ±45° from the spaced intermediate portion between the first and second magnetic piece portions 5, 6. When the magnet plate 4 rotates in the positive direction, that is, clockwise in the drawing, the arcuate edge 4A is allowed to face the first magnetic piece portion 5 by an angular range "θ1" and the other arcuate edge 4B of the magnet plate 4 is allowed to face the third magnetic piece portion 70 by the same angular range. While, when the magnet plate 4 rotates in the negative direction, that is, counterclockwise in the drawing, the arcuate edge 4A is allowed to face the second magnetic piece portion 6 by an angular range "θ2" and the other arcuate edge 4B is allowed to face the third magnetic piece portion 70. The magnetic flux produced by the magnet plate 4 is led from the first and third magnetic piece portions 5, 70 to the first Hall-element 11 through the first and third magnetic path forming portions 8, 72, and at the same time, the magnetic flux is led from the second and third magnetic pieces 6, 70 to the second Hall-element 12 through the first and third magnetic path forming portions 9, 72.

Figure 17:
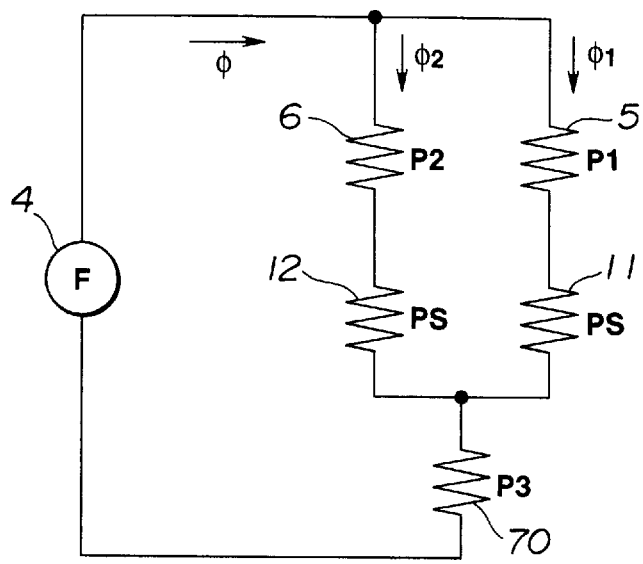
FIG. 17 is a magnetic circuit provided by the rotation angle sensor of the fifth embodiment.
Figure 18:
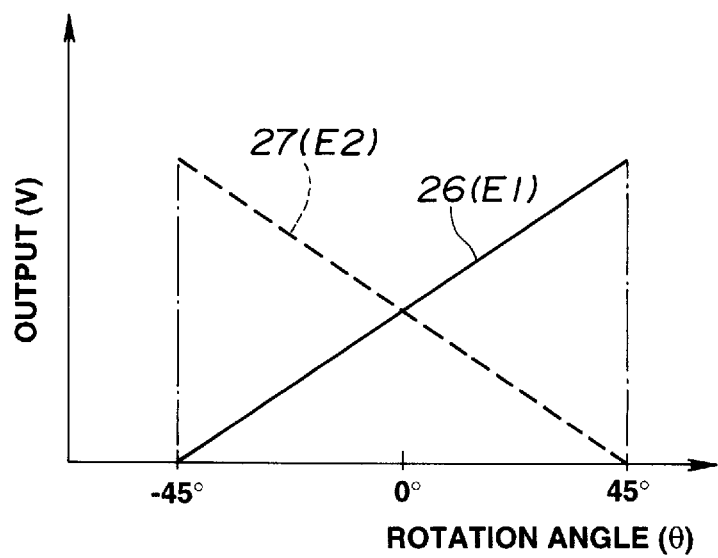
FIG. 18 is a graph showing a relationship between an output voltage of each of first and second Hall-elements employed in the sensor of the fifth embodiment and a rotation angle to be sensed.

As is shown in FIGS. 17 and 18, in this condition, the magnet plate 4 and first Hall-element 11 constitute a first magnetic circuit, and the magnet plate 4, the magnetic piece portions 6, 70 and the second Hall-element 12 constitute a second magnetic circuit. These two magnetic circuits are magnetically connected in a manner as shown.

When the inverse value of a magnetic resistance value between the arcuate edge 4A of the magnet plate 4 and each of the first and second magnetic piece portions 5, 6 is represented by a permeance P1 or P2, the permeance P1 and the permeance P2 are derived from the following equations:

$$P1 = \alpha \times \mu 0 \times \theta 1 \tag{16}$$
$$= \alpha \times \mu 0 \times (45° + \theta)$$
$$P2 = \alpha \times \mu 0 \times \theta 2 \tag{17}$$
$$= \alpha \times \mu 0 \times (45° - \theta)$$

In the above equation, the value α is a constant value which is determined by the axial length of the magnet plate 4, the axial length of each of the magnetic piece portions 5, 6 and the distance between the magnet plate 4 and each of the magnetic piece portions 5, 6. The value "$\mu 0$" represents a magnetic permeability in vacuum.

When the inverse value of a magnetic resistance value between the other arcuate edge 4B of the magnet plate 4 and the third magnetic piece portion 70 is represented by a permeance P3, the permeance is derived from the following equation.

$$P3 = \alpha \times \mu 0 \times 90° = P1 + P2 \tag{18}$$

When the inverse value of a magnetic resistance value appearing around the first and second Hall elements 11, 12 is represented by a permeance PS, the fact wherein the permeance PS is quite small as compared with the permeance P1, P2 of the first and second magnetic piece portions 5, 6 makes the value of the permeance PS negligible.

Accordingly, the total "φ" of the magnetic flux produced based on the magnetomotive force of the magnet plate 4 and passing through the first and second magnetic circuits is always constant as is represented by the following equation.

$$\begin{aligned}\phi &= F \times 1/(1/(P1+P2)+1/P3) \quad (19)\\ &= F \times P3/2\\ &= F \times \alpha \times \mu 0 \times 90°/2\end{aligned}$$

That is, the value $\phi$ is constant.

The magnetic flux $\phi 1$, $\phi 2$ passing through the magnetic piece portion 5, 6 has the following connection.

That is, $$\begin{aligned}\phi 1{:}\phi 2 &= P1{:}P2 \quad (20)\\ \phi 1 &= \phi \times \phi 1/(P1+P2) \quad (21)\\ &= \phi \times \alpha \times \mu 0 \times (45°+\theta)/(\alpha \times \mu 0 \times 90°)\\ &= \phi \times (0.5 + \theta/90°)\\ \phi 2 &= \phi \times P2/(P1+P2) \quad (22)\\ &= \phi \times \alpha \times \mu 0 \times (45°-\theta)/(\alpha \times \mu 0 \times 90°)\\ &= \phi \times (0.5 - \theta/90°)\end{aligned}$$

Since the facing area between the leading end 8A of the first magnetic path forming portion 8 and the leading end 72a of the third magnetic path forming portion 72 is equal to that between the leading end 9A of the second magnetic path forming portion 9 and the leading end 72a, the density B1 or B2 of the magnetic flux passing through the first or second Hall element 11, 12 is represented by the following equations wherein $\beta$ represents a constant.

$$B1 = \beta \times \phi 1 \quad (23)$$

$$B2 = \beta \times \phi 2 \quad (24)$$

Since the Hall-elements 11, 12 have identical characteristics and the output voltage E1 or E2 of the Hall element 11 or 12 is proportional to the density of magnetic flux B1 or B2, the following equations are obtained.

$$\begin{aligned}E1 &= G \times B1 \quad (25)\\ &= G \times \beta \times \phi \times (0.5+\theta/90°)\\ E2 &= G \times B2 \quad (26)\\ &= G \times \beta \times \phi \times (0.5-\theta/90°)\end{aligned}$$

In these equations, G denotes the sensitivity of the Hall-element 11, 12, which determines the output voltage E1, E2 with respect to the density B1, B2 of magnetic flux.

As a result, as is understood from the solid characteristic line 26 of FIG. 18, the output voltage E1 of the Hall-element 11 is proportional to the rotation angle θ, and thus with increase of the rotation angle θ, the output voltage E1 increases. That is, when the rotation angle θ is −45°, the output voltage E1 is 0V(volt) because under such condition the magnetic piece portion 5 does not face the arcuate edge 4A of the magnet plate 4. Since the facing area between the magnetic piece portion 5 and the arcuate edge 4A of the magnet plate 4 increases with increase of the rotation angle θ, the output voltage E1 increases in proportion to the facing area, and when the rotation angle θ is 45°, the output voltage exhibits the maximum value.

Although, as is understood from the dotted characteristic line of FIG. 18, the output voltage E2 of the Hall-element 12 is also proportional to the rotation angle θ. That is, the output voltage E2 reduces with increase of the rotation angle θ. That is, when the rotation angle θ is −45°, the output voltage E2 shows the maximum value because under such condition the magnetic piece portion 6 faces the entire outer surface of the arcuate edge 4A of the magnet plate 4. With increase of the rotation angle θ, the facing area between the magnetic piece portion 6 and the arcuate edge 4A of the magnet plate 4 is reduced and thus the output voltage E2 is reduced. When the rotation angle θ is 45°, the output voltage is 0V (volt).

The sensitivity G of the Hall-elements 11, 12 is affected by the surrounding temperature, and thus the output voltage E1, E2 is varied accordingly. Since the total magnetic flux "F" depends upon the magnetomotive force F of the magnet plate 4, the output voltage E1, E2 is varied while being affected by the magnetomotive force "F" of the magnet plate 4.

For compensating the above, the output voltage E1, E2 is inputted to the calculating circuit 19, and the following calculation is carried out in the calculation circuit 19.

$$Sx = (E1-E2)/(E1+E2) = (2/90°)\times\theta \quad (27)$$

That is, the subtracter 21 of the circulation circuit 19 effects a subtraction to the output voltage E1, E2 to derive a subtraction value (E1−E2), and the adder 20 adds the output value E1, E2 to derive an addition value (E1+E2). The divider 22 divides the value (E1−E2) by the value (E1+E2), that is, effects the equation 27.

The base voltage generator 24 inputs a base voltage to the divider 22, the amplifier 23 amplifies the calculation signal Sx outputted from the divider 22, and the correcting signal generator 25 feeds the amplifier 23 with a correcting signal to allow the amplifier 23 to issue a corrected amplified signal So.

That is, based on the signal Sx, the signal So is obtained from the following equation.

$$\begin{aligned}So &= k \times Sx + Vo \quad (28)\\ &= ((2 \times k \times \phi)/90°) + Vo\end{aligned}$$

Vo is a constant voltage (for example 2.5V), and the constant k represents an amplification factor.

Figure 19:
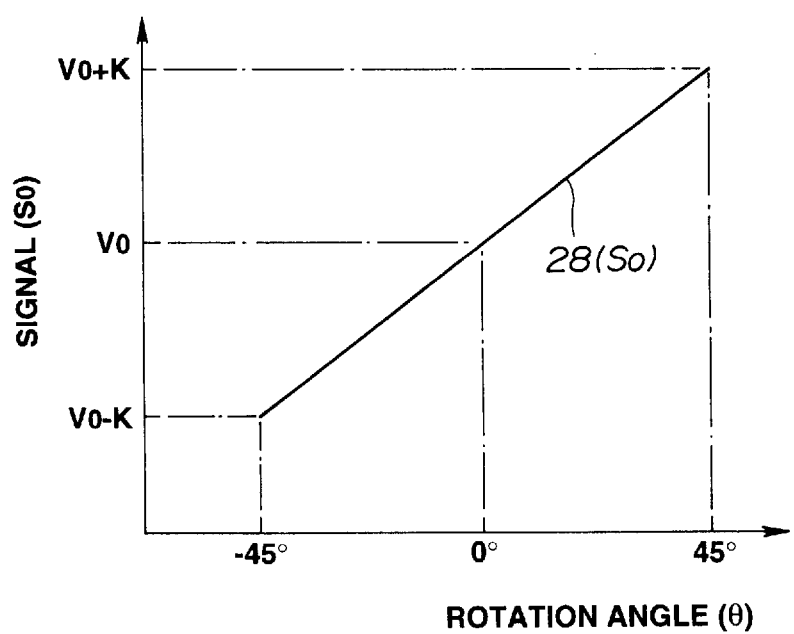
FIG. 19 is a graph showing a relationship between a signal from an arithmetic circuit employed in the sensor of the fifth embodiment and a rotation angle to be sensed.

With the above, the signal So has such a characteristic as is shown by the solid characteristic line 28 of FIG. 19. Thus, when the rotation angle θ is −45°, the signal exhibits the minimum value (So=Vo−k), and when the rotation angle θ is 45°, the signal So exhibits the maximum value (So=Vo+k).

The signal So is determined substantially by only the rotation angle θ and thus protected from being affected by the magnetomotive force of the magnet plate 4 and the sensitivity of the Hall-elements 11, 12.

Due to similarity in construction to the above-mentioned first embodiment 100A, the rotation angle sensor 100E of this fifth embodiment has the same advantages as the first embodiment.

If desired, the magnet plate 4 may be replaced with the magnetic plate 31 shown in FIG. 9.

Figure 20:
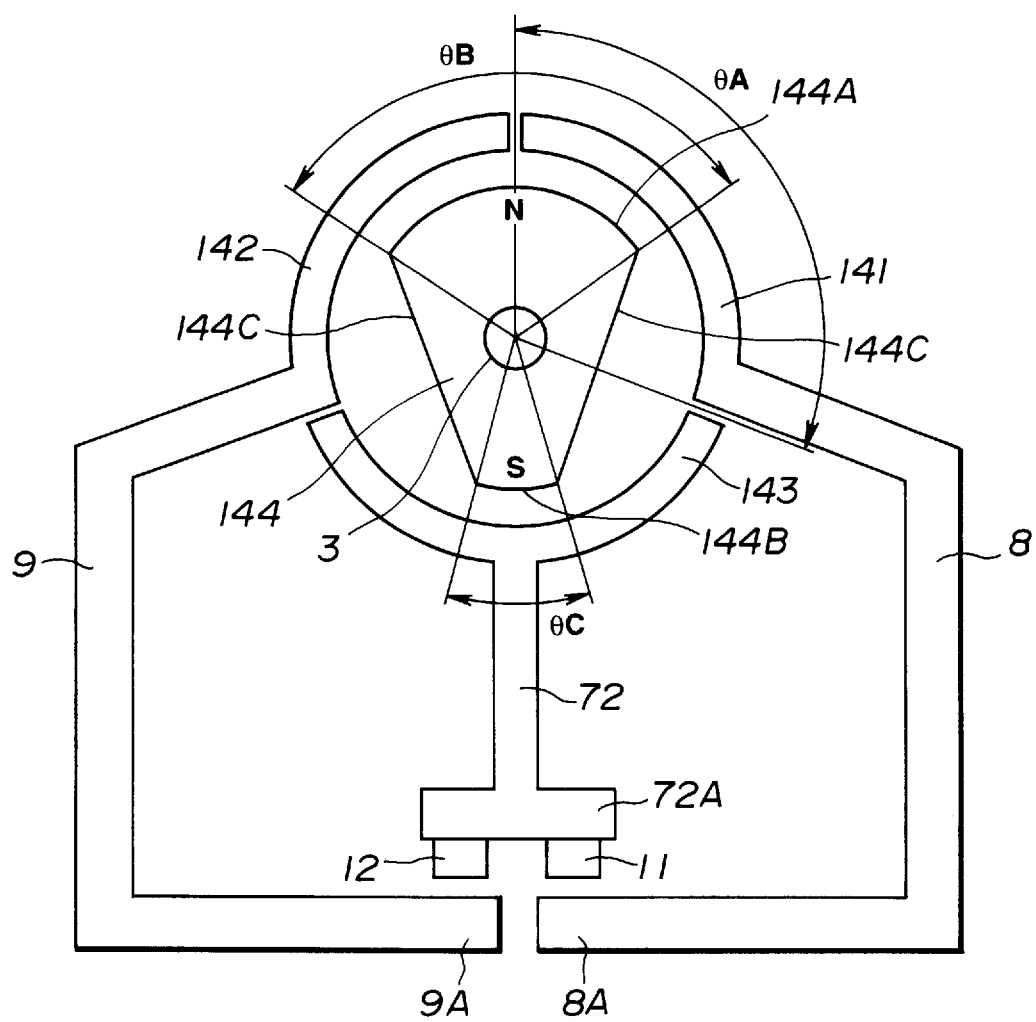
FIG. 20 is a block diagram of a rotation angle sensor of a sixth embodiment of the invention, showing a positional relationship between various parts of the same.

Referring to FIG. 20, there is shown a rotation angle sensor 100F of a sixth embodiment of the present invention. This embodiment 100F is similar to the above-mentioned fifth embodiment 100E. For ease of description, the parts which are substantially the same as those of the fifth embodiment 100E are denoted by the same numerals and explanation of them will be omitted from the following.

In this sixth embodiment 100F, the first and second magnetic piece portions 141 and 142 each extend around the axis of the shaft 3 by an angle "θA" (for example, 110°) which exceeds 90°. Furthermore, the arcuate edge 144A (N-pole) of the magnet plate 144 which can face the first and second magnetic piece portions 141, 142 is shaped larger than the other arcuate edge 144B. That is, the arcuate edge 144A has a central angle "θ B" which is equal to the angle "θ A".

The third magnetic piece portion 143 arranged between the first and second magnetic piece portions 141, 142 extends around the axis of the shaft 3 by an angle (for example 140°) which is smaller than 180°. The smaller arcuate edge 144B (S-pole) of the magnet plate 44 which can face the third magnetic piece portion 143 has a central angle θ C (for example, about 30°) which is smaller than 90°. Thus, as shown the sides 144C, 144C by which the larger and smaller edges 144A and 144B are connected constitute inclined surfaces.

Due to similar construction to the above-mentioned fifth embodiment 100E, the rotation angle sensor 100F of this sixth embodiment has substantially the same advantages as those of the fifth embodiment 100E.

Figure 21:
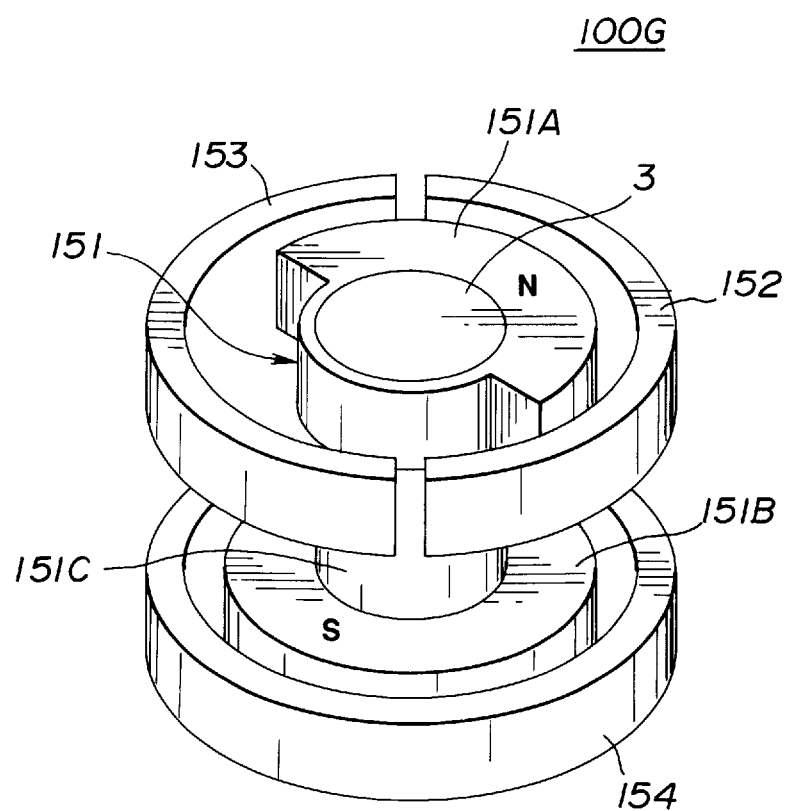
FIG. 21 is a perspective view of assembled parts installed in a rotation angle sensor of a seventh embodiment of the invention.

Referring to FIG. 21, there is shown a rotation angle sensor 100G which is a seventh embodiment of the present invention.

In this embodiment, a magnet unit 151 is employed, which comprises a semicircular magnet plate portion 151A with N-pole, a circular magnet plate portion 151B with S-pole and a shaft portion 151C which extends between the two magnet plate portions 151A and 151B. As shown, the magnet unit 151 is concentrically and securely disposed on the throttle valve shaft 3 to rotate therewith. Around the semicircular plate portion 151A, there are concentrically arranged first and second magnetic piece portions 152, 153 each being arcuate in shape. Around the circular plate portion 151B, there is concentrically arranged a third magnetic piece portion 154 which is annular in shape.

The seventh embodiment 100F has advantages substantially the same as those of the fifth embodiment 100E. Particularly, in the seventh embodiment 100F, due to the axially extending shape of the magnet unit 151, each of the first and second magnetic piece portions 152, 153 is allowed to have an increased length, which brings about increase in detecting range of the rotation angle sensor 100F.

In the above-mentioned embodiments, an arrangement is employed wherein the calculation circuit 19 which, based on the output voltage E1, E2 of the first and second Hall-elements 11, 12, outputs a signal So in accordance with the rotation angle θ of the shaft 3 is installed in the casing 1. However, the invention is not limited to such arrangement. That is, if desired, the calculation circuit 19 may be arranged outside of the casing 1.

In the above-mentioned embodiments, an arrangement is employed wherein the magnet plate 4 (31, 41, 51, 144, 151) is secured to the rotation shaft 3. However, if desired, another arrangement may be employed wherein the magnet plate 4 is connected to the casing 1 and the first and second magnetic piece portions and the third magnetic piece portion are arranged to be rotated by the shaft 3.

What is claimed is:

1. A rotation angle sensor for sensing a pivot angle of a pivotal member, comprising:
    a first unit including a magnet member;
    a second unit including first, second and third magnetic piece members which are circumferentially arranged to concentrically surround said magnet member, said first and second magnetic piece members being symmetrically located with respect to said magnet member;
    connecting means for connecting one of said first and second units with said pivotal member to induce a united pivoting therebetween;
    first signal generating means magnetically connected to said first and third magnetic piece members to generate a first signal in accordance with a density of magnetic flux produced therebetween when a relative pivoting occurs between said first and second units;
    second signal generating means magnetically connected to said second and third magnetic piece members to generate a second signal in accordance with a density of magnetic flux produced therebetween when a relative pivoting occurs between said first and second units; and
    a control unit for calculating a pivot angle between said first and second units by processing said first and second signals.

2. A rotation angle sensor as claimed in claim 1, in which with said connecting means, said first unit is connected to said pivotal member so that said magnet member rotates together with said pivotal member.

3. A rotation angle sensor as claimed in claim 2, in which said first, second and third magnetic piece members are arranged to constitute a divided cylindrical structure which concentrically surrounds said magnet member.

4. A rotation angle sensor as claimed in claim 1, in which each of said first and second signal generating means is a Hall-element.

5. A rotation angle sensor as claimed in claim 2, in which second unit is embedded in a plastic casing, said casing being formed with a circular recess in which said magnet member is rotatably installed.

6. A rotation angle sensor as claimed in claim 5, in which said magnet member is shaped generally elliptical and includes diametrically opposed arcuate edges and parallel side edges.

7. A rotation angle sensor as claimed in claim 5, in which said magnet member comprises diametrically opposed sectoral portions and a rectangular middle portion.

8. A rotation angle sensor as claimed in claim 2, in which each of said first and second magnetic piece members includes a first arcuate segment of an imaginary circle which is concentric with a rotation axis of said magnet member, and in which said third magnetic piece member includes a second arcuate segment of said imaginary circle, and in which respective central angles of said first and second arcuate segments with respect to said rotation axis are approximately 90° and approximately 180°, respectively.

9. A rotation angle sensor as claimed in claim 2, in which each of said first, second and third magnetic piece members includes an arcuate segment of an imaginary circle which is concentric with a rotation axis of said magnet member, and in which respective central angles of said arcuate segments of said first, second and third magnetic piece members with respect to said rotation axis are approximately 120°.

10. A rotation angle sensor as claimed in claim 1, in which said third magnetic piece member is divided into fourth and fifth magnetic piece members each being interposed between said first and second magnetic piece members, said first signal generating means generating the first signal in accordance with a density of magnetic flux produced between said first and fourth magnetic piece members, and said second signal generating means generating the second signal in accordance with a density of magnetic flux produced between said second and fifth magnetic piece members.

11. A rotation angle sensor as claimed in claim 10, in which with said connecting means, said first unit is connected to said pivotal member so that said magnet member rotates together with said pivotal member.

12. A rotation angle sensor as claimed in claim 11, in which said first, second, fourth and fifth magnetic piece members are arranged to constitute a divided cylindrical structure which concentrically surrounds said magnet member.

13. A rotation angle sensor as claimed in claim 12, in which said magnet member is shaped generally elliptical and includes diametrically opposed arcuate edges and parallel side edges.

14. A rotation angle sensor as claimed in claim 12, in which said magnet member comprises diametrically opposed sectoral portions and a rectangular middle portion.

15. A rotation angle sensor as claimed in claim 10, in which each of said first, second, fourth and fifth magnetic piece members includes an arcuate segment of an imaginary circle which is concentric with a rotation axis of said magnet member, and in which respective central angles of said arcuate segments of said first, second, fourth and fifth magnetic piece members with respect to said rotation axis are approximately 90°.

16. A rotation angle sensor as claimed in claim 10, further comprising a magnetic ring which is arranged to concentrically surround the magnet member, said ring being connected to said pivotal member to pivot therewith.

17. A rotation angle sensor as claimed in claim 16, in which said magnetic ring comprises:

two diametrically opposed arcuate magnetic pieces; and two diametrically opposed non-magnetic pieces, wherein these four pieces are alternatively arranged to constitute the ring.

* * * * *